United States Patent
Mori

(10) Patent No.: US 11,620,840 B2
(45) Date of Patent: Apr. 4, 2023

(54) IMAGE PROCESSING APPARATUS FOR EXTRACTING A DESIRED CHARACTER STRING FROM A SCANNED IMAGE

(71) Applicant: CANON KABUSHIKI KAISHA, Tokyo (JP)

(72) Inventor: Namihiro Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/576,334

(22) Filed: Jan. 14, 2022

(65) Prior Publication Data

US 2022/0237933 A1 Jul. 28, 2022

(30) Foreign Application Priority Data

Jan. 22, 2021 (JP) .............................. JP2021-009133

(51) Int. Cl.
*G06V 30/14* (2022.01)
*H04N 1/00* (2006.01)
*G06V 30/148* (2022.01)

(52) U.S. Cl.
CPC ........ *G06V 30/1456* (2022.01); *G06V 30/153* (2022.01); *H04N 1/0044* (2013.01); *G06V 2201/10* (2022.01)

(58) Field of Classification Search
None
See application file for complete search history.

(56) References Cited

U.S. PATENT DOCUMENTS

2019/0197303 A1* 6/2019 Kanada ................ G06V 10/768
2019/0266397 A1* 8/2019 Arakawa .............. G06V 30/418

FOREIGN PATENT DOCUMENTS

JP 2019149788 A 9/2019

* cited by examiner

*Primary Examiner* — Andrew H Lam
(74) *Attorney, Agent, or Firm* — Canon U.S.A., Inc. IP Division

(57) ABSTRACT

In the case of learning a printed character region selected by a user, it is determined whether a handwritten character region is present near the printed character region. If it is determined that the handwritten character region is present near the printed character region, information about the handwritten character region present near the printed character region and information about another printed character region present near the printed character region are learned in association with information about the selected printed character region. This makes it possible to appropriately determine a circled character string and a character string selected with a check mark from among a plurality of options during a scanned image analysis.

7 Claims, 20 Drawing Sheets

FIG.6A

SCANNED BUSINESS FORM LIST — 600

- 602 TRANSMIT
- 603 EDIT
- 604 DELETE

601

| BUSINESS FORM NAME (605) | DESTINATION (606) | STATUS (607) | TYPE (608) |
|---|---|---|---|
| 001 | CLOUD STORAGE A | NOT YET LEARNED | ESTIMATE |
| 002 | CLOUD STORAGE A | NOT YET LEARNED | ESTIMATE |
| 003 | CLOUD STORAGE A | LEARNED | INVOICE AAA |
| 004 | CLOUD STORAGE A | NOT YET LEARNED | ESTIMATE |
| 005 | CLOUD STORAGE A | LEARNED | INVOICE BBB |

FIG.6B

FILE NAME SETTING SCREEN — 610

- 611: APPLICATION_BB BB_F
- 613: ✕

612:

APPLICATION

ISSUE DATE  JUNE 6, 2012

| MEMBERSHIP NO. | 43734529 | | |
|---|---|---|---|
| NAME | BB BB | SEX | M (F) |
| ADDRESS | POSTCODE 111-1111 <br> 1-1-1, XXXX, YYYY, ZZZZ | | |

- 616: ↩
- 614: +
- 615: −
- 617: OK

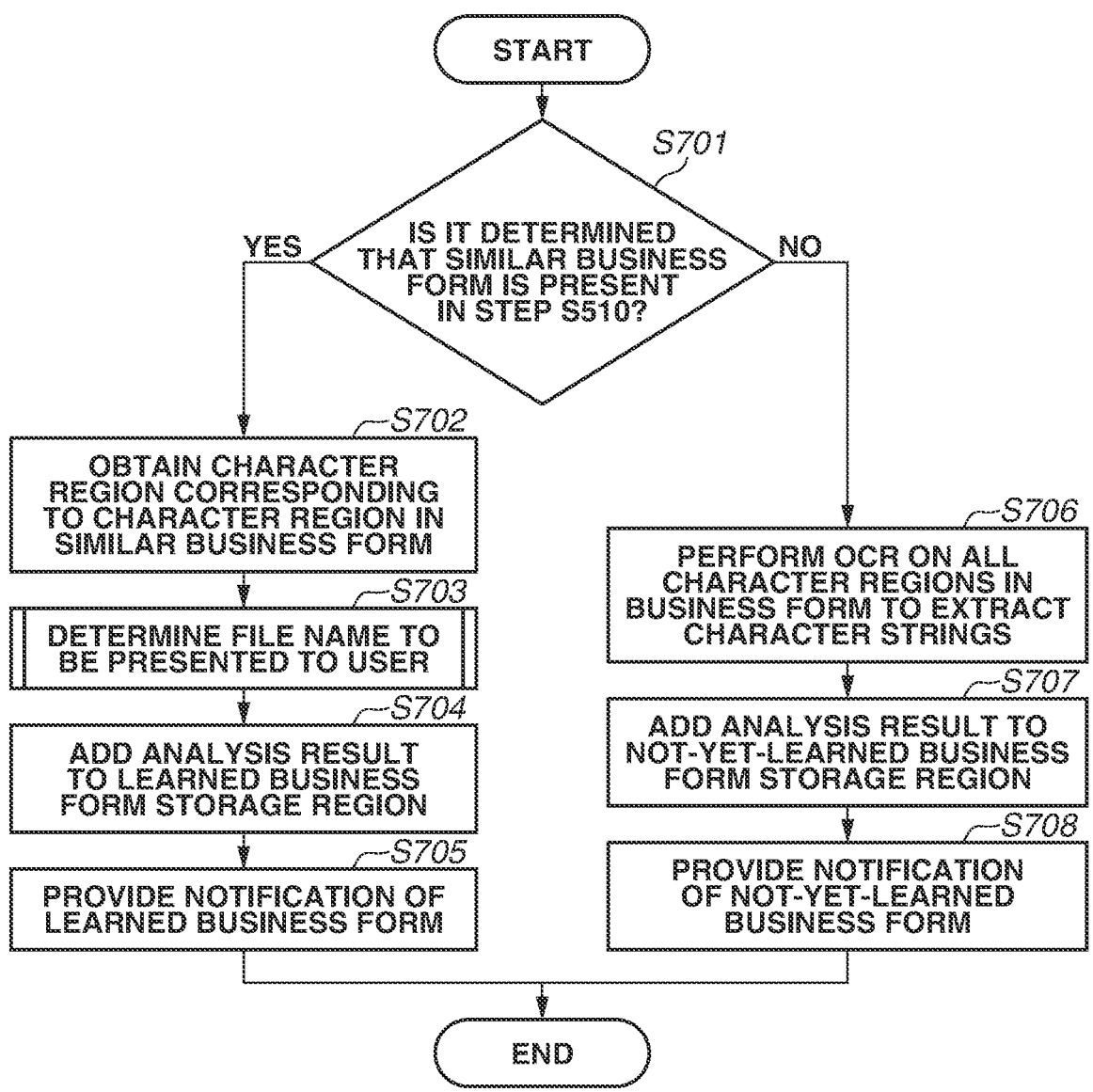

FIG.8A1

```
{
  "formId": "aaaaaaaa-ffff-49ab-acf8-55558888eeee",
  "learningContent": {
    "rectInfoArray": [
      {
        "key": "fileRegion0",
        "regions": [
          {
            "type": "printing",
            "rect": {
              "x": 1017,
              "y": 302,
              "width": 489,
              "height": 94
            }
          }
        ]
      },
      {
        "key": "fileRegion1",
        "regions": [
          {
            "type": "handwritten",
            "rect": {
              "x": 406,
              "y": 626,
              "width": 594,
              "height": 71
            }
          }
        ]
      },
      {
        "key": "fileRegion2",
        "regions": [
          {
            "type": "printing",
            "rect": {
              "x": 515,
              "y": 618,
              "width": 46,
              "height": 48
            },
```

FIG.8A2

```
            "relatedInfo": [
                {
                    "type": "handwritten",
                    "rect": {
                        "x": 515,
                        "y": 618,
                        "width": 46,
                        "height": 48
                    }
                },
                {
                    "type": "printing",
                    "text": "F",
                    "rect": {
                        "x": 515,
                        "y": 618,
                        "width": 46,
                        "height": 48
                    }
                }
            ]
        }
    ],
    "metadataArray": [
        {
            "key": "filename",
            "keyType": "filename",
            "value": [
                "fileRegion0",
                "seperator",
                "fileRegion1",
                "seperator",
                "fileRegion2"
            ]
        }
    ]
}
```

FIG.8B1

```
{
  "matched": true,
  "formId": "aaaaaaaa-ffff-49ab-acf8-55558888eeee",
  "matchingScore": 0.74582005269911589,
  "rectInfoArray": [
    {
      "key": "fileRegion0",
      "regions": [
        {
          "type": "printing",
          "rect": {
            "x": 1017,
            "y": 302,
            "width": 489,
            "height": 94
          },
          "text": "APPLICATION"
        }
      ]
    },
    {
      "key": "fileRegion1",
      "regions": [
        {
          "type": "handwritten",
          "rect": {
            "x": 406,
            "y": 626,
            "width": 594,
            "height": 71
          },
          "text": "AAA AA"
        }
      ]
    },
```

FIG.8B2

```
{
  "key": "fileRegion2",
  "regions": [
    {
      "type": "printing",
      "rect": {
        "x": 515,
        "y": 618,
        "width": 46,
        "height": 48
      },
      "text": "M"
    }
  ]
}
],
"metadataArray": [
  {
    "key": "filename",
    "keyType": "filename",
    "value": [
      "fileRegion0",
      "separator",
      "fileRegion1",
      "seperator",
      "fileRegion2"
    ]
  }
 ]
}
```

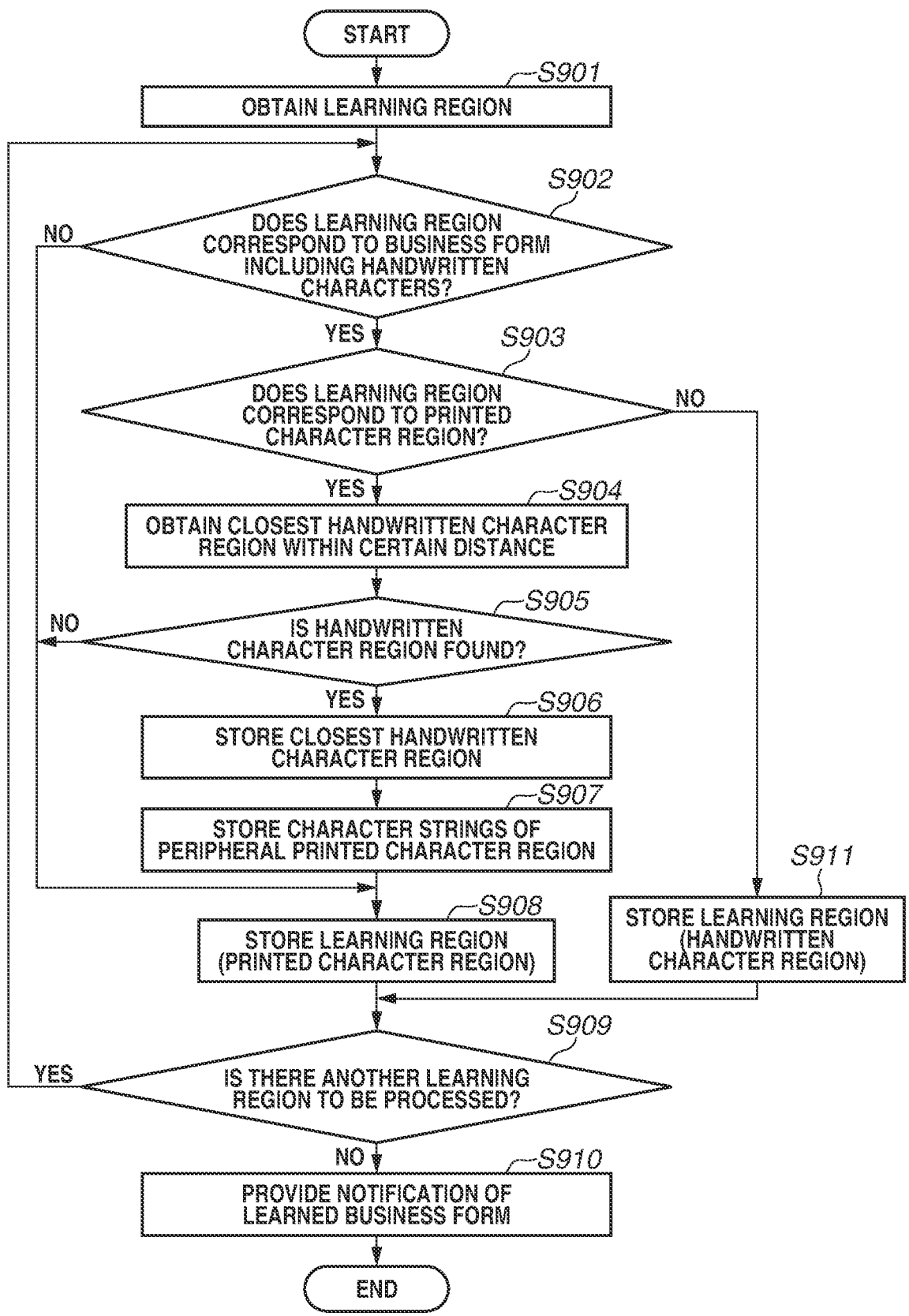

FILE NAME SETTING SCREEN

APPLICATION_BB BB_F  ✕

APPLICATION
ISSUE DATE  JUNE 6, 2012

| MEMBERSHIP NO. | | | 43734529 | |
|---|---|---|---|---|
| NAME | BB BB | SEX | M ☐ | F ☑ |
| ADDRESS | POSTCODE 111-1111 1-1-1, XXXX, YYYY, ZZZZ | | | |

HANDWRITTEN CHARACTER REGION
CLOSEST TO LEARNING REGION

| MEMBERSHIP NO. | | | 43734529 |
|---|---|---|---|
| NAME | BB BB | M ☐ F | ☑ |

LEARNING REGION

HANDWRITTEN CHARACTER REGION SECOND CLOSEST TO LEARNING REGION

FIG.15C

FILE NAME SETTING SCREEN

APPLICATION_AAA AA_F

APPLICATION

ISSUE DATE OCTOBER 16, 2012

| MEMBERSHIP NO. | 23946709 | | | |
|---|---|---|---|---|
| NAME | AAA AA | SEX | M ☑ | F ☐ |
| ADDRESS | POSTCODE 111-1111 1-1-1, XXXX, YYYY, ZZZZ | | | |

REGION CORRESPONDING TO HANDWRITTEN CHARACTER REGION CLOSEST TO LEARNING REGION

| MEMBERSHIP NO. | 23946709 | |
|---|---|---|
| NAME | AAA AA | M ☑ F ☐ |

REGION CORRESPONDING TO LEARNING REGION

FIG.15E

| MEMBERSHIP NO. | 23946709 | |
|---|---|---|
| NAME | AAA AA | M ☑ F ☐ |

LEARNING REGION

HANDWRITTEN CHARACTER REGION CLOSEST TO LEARNING REGION

IMAGE PROCESSING APPARATUS FOR EXTRACTING A DESIRED CHARACTER STRING FROM A SCANNED IMAGE

BACKGROUND

Field

The present disclosure relates to an image processing apparatus for extracting a desired character string from a scanned image, an image processing method, and a storage medium.

Description of the Related Art

A system for scanning and digitizing a paper business form and setting a file name of the scanned image of the digitized business form based on the written contents of the business form, to thereby manage the business form has heretofore been known. Examples of the method of setting such a file name include a method of setting a file name based on a recognition result obtained by performing a character recognition process on a business form image. Japanese Patent Application Laid-Open No. 2019-149788 discusses a technique in which positional information about a text block used for a file name is associated with each of a plurality of registered document images and the information is stored in a storage unit. Further, it is determined whether a query image obtained by scanning a new document is similar to any one of the registered document images. An optical character recognition (OCR) target text block in the query image is identified based on the positional information about the text block associated with the similar registered document image, and a file name is assigned using the OCR result for the identified text block. In the technique discussed in Japanese Patent Application Laid-Open No. 2019-149788, a text block located at a position designated by a user is used for the file name.

On some business forms having a plurality of options printed thereon, the user may select any one of the options by handwriting. For example, on a business form document having gender options, i.e., "M" (male) and "F" (female), printed thereon, the user may select one of the options by circling one of the options or by adding a check mark. When such a business form document is scanned, a character string selected by handwriting may be used as additional information such as a file name. However, in the technique discussed in Japanese Patent Application Laid-Open No. 2019-149788, the text block located at the same position is used for the file name of each business form of the same type. Therefore, this technique is not suitable for a use case in which a character string selected from among a plurality of options by the user is used as a file name. In particular, in the technique discussed in Japanese Patent Application Laid-Open No. 2019-149788, the user makes a setting for automatically storing (learning) the position of the text block used for the file name, and uses the text block located at the position when a similar document is scanned next time. However, if this learning process is applied to a business form document including a plurality of options, only the position of a character string corresponding to an option designated as the file name by the user from among the plurality of options is learned. In other words, if the method of learning the position of a text block as discussed in Japanese Patent Application Laid-Open No. 2019-149788 is employed, a character string located at the same position is constantly used as the file name of each business form even if there are other options to be selected.

SUMMARY

According to an aspect of the present disclosure, an image processing apparatus including at least one memory that stores a program, and at least one processor that executes the program to perform obtaining a plurality of regions including a printed character region and a handwritten character region from a first scanned image, learning information about a region selected by a user from among the plurality of regions obtained, and outputting a character string of a corresponding region in a second scanned image similar to the first scanned image based on the learned information, wherein, in the learning, in a case where the region selected by the user is the printed character region, it is determined whether the handwritten character region is present near the selected printed character region, and in a case where it is determined that the handwritten character region is present near the selected printed character region, information about the handwritten character region present near the selected printed character region and information about another printed character region present near the selected printed character region are learned in association with information about the selected printed character region.

Further features of the present disclosure will become apparent from the following description of exemplary embodiments with reference to the attached drawings.

BRIEF DESCRIPTION OF THE DRAWINGS

FIGS. 6A and 6B each illustrate an example of a screen to be displayed on the MFP or the client PC.

FIG. 7 is a flowchart illustrating details of a character recognition process performed by an image processing unit in the system.

FIG. 9 is a flowchart illustrating an example of the input information storage process.

FIGS. 15A to 15E each illustrate a specific example of a business form image that requires the relearning process.

DESCRIPTION OF THE EMBODIMENTS

Exemplary embodiments for carrying out the present disclosure will be described below with reference to the drawings. The following exemplary embodiments are not meant to limit the scope of the present disclosure as encompassed by the appended claims. Further, not all combinations of features described in the exemplary embodiments are essential for solving means of the present disclosure.

Figure 1:
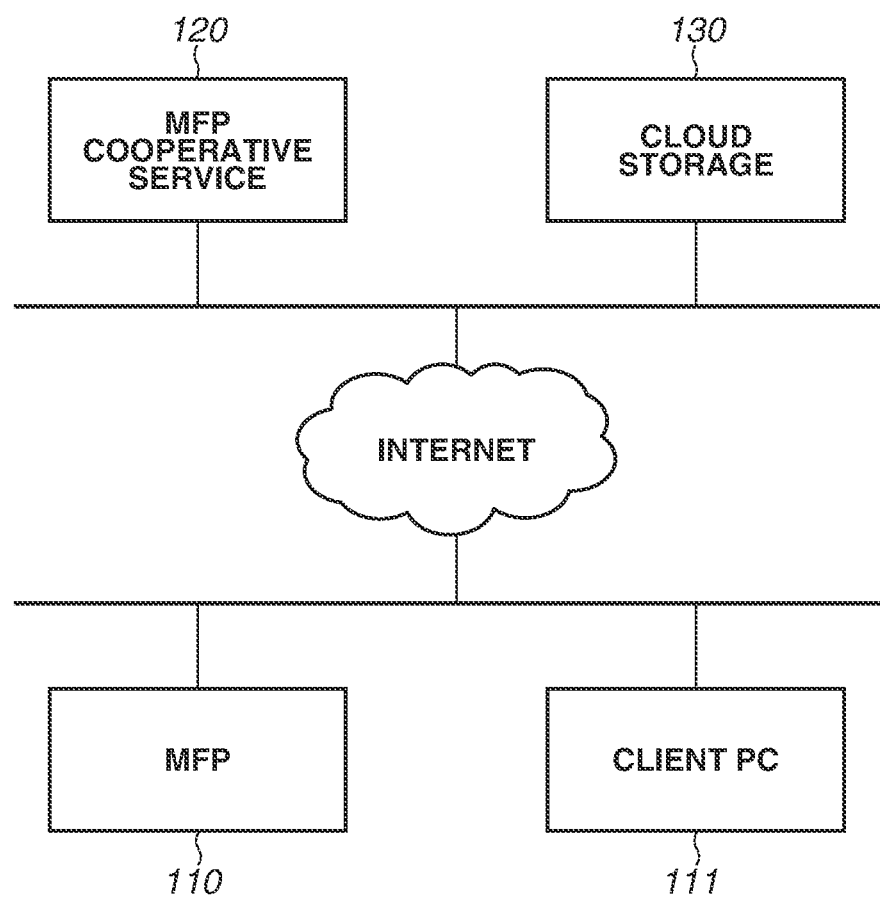
FIG. 1 is a block diagram illustrating an overall configuration of a system according to a first exemplary embodiment.

A first exemplary embodiment will be described. FIG. 1 is a block diagram illustrating an overall configuration of an image processing system according to the first exemplary embodiment. The image processing system includes a multifunction peripheral (MFP) 110, a client personal computer (PC) 111, an MFP cooperative service 120, and a cloud storage 130. The MFP 110 and the client PC 111 are communicably connected to a server that provides various services on the Internet via a local area network (LAN).

The MFP 110 is a multifunction peripheral including a plurality of functions such as a scanner function and a printer function. The client PC 111 is a computer including an application that is provided with services from the MFP cooperative service 120. The MFP cooperative service 120 is a service for receiving an image file scanned by the MFP 110, processing images, and storing the image file and image processing results in the server of the MFP cooperative service 120 or another storage service. The MFP cooperative service 120 is provided by a cloud service or a dedicated server, and is an example of an image processing apparatus. The cloud storage 130 is a service for storing a file received via the Internet and transmitting a file in response to a request from an application such as a web browser of the client PC 111.

While the present exemplary embodiment illustrates an example where the image processing system includes the MFP 110, the client PC 111, the MFP cooperative service 120, and the cloud storage 130 as described above, the configuration of the image processing system is not limited to this example. For example, the MFP 110 may include the functions of the client PC 111 and the MFP cooperative service 120, and may also function as the image processing apparatus. The MFP cooperative service 120 may be connected to a server on a LAN, instead of being connected on the Internet. The cloud storage 130 may be replaced with a mail server or the like and may transmit a scanned image attached to an electronic mail (email).

Figure 2:
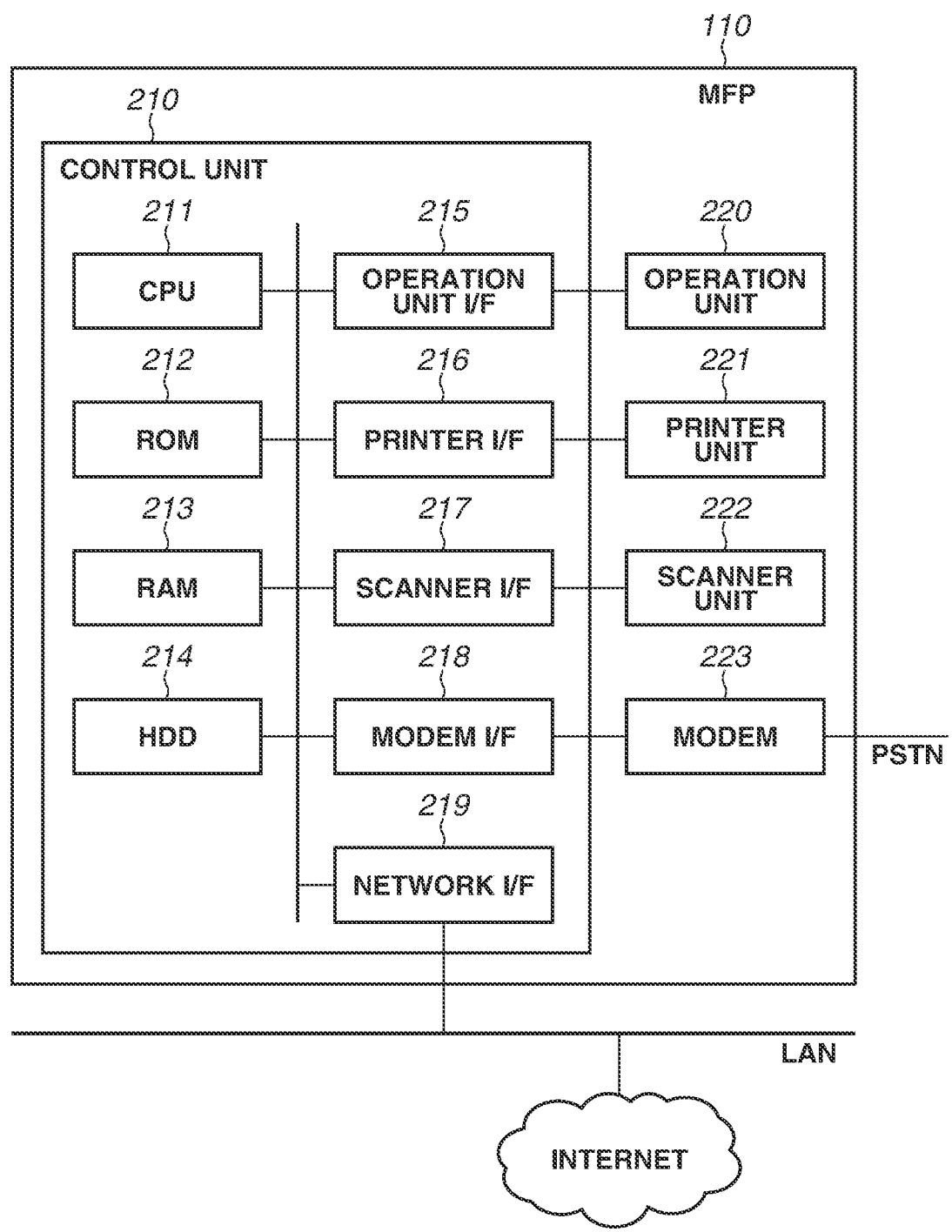
FIG. 2 is a block diagram illustrating a hardware configuration of a multifunction peripheral (MFP).

FIG. 2 is a block diagram illustrating a hardware configuration of the MFP 110. The MFP 110 includes a control unit 210, an operation unit 220, a printer unit 221, a scanner unit 222, and a modem 223. The control unit 210 includes a central processing unit (CPU) 211, a read-only memory (ROM) 212, a random access memory (RAM) 213, a hard disk drive (HDD) 214, an operation unit interface (I/F) 215, a printer I/F 216, a scanner I/F 217, a modem I/F 218, and a network I/F 219, which are descried below, and controls the overall operation of the MFP 110. The CPU 211 reads out control programs stored in the ROM 212, and executes and controls various functions of the MFP 110. Various functions include reading, printing, and communication functions. The RAM 213 is used as a temporary storage area such as a main memory or a work area for the CPU 211. The present exemplary embodiment illustrates an example where a single CPU 211 executes each process in flowcharts to be described below using a memory (RAM 213 or HDD 214). However, the present exemplary embodiment is not limited to this example. For example, each process may be executed by causing a plurality of CPUs or a plurality of RAMs or HDDs to operate with each other. The HDD 214 is a large capacity storage unit for storing image data and various programs. The operation unit I/F 215 is an interface for connecting the operation unit 220 and the control unit 210. The operation unit 220 is provided with a touch panel, a keyboard, and the like, and receives an operation, an input, and an instruction from a user. The printer I/F 216 is an interface for connecting the printer unit 221 and the control unit 210. Image data for printing is transferred from the control unit 210 to the printer unit 221 via the printer I/F 216, and is printed on a recording medium. The scanner I/F 217 is an interface for connecting the scanner unit 222 and the control unit 210. The scanner unit 222 scans a document set on a platen glass or an auto document feeder (ADF) (not illustrated) to generate image data, and outputs the generated image data to the control unit 210 via the scanner I/F 217. The MFP 110 is configured to print out (copy) the image data generated by the scanner unit 222 from the printer unit 221, and to transmit a file or transmit an email. The modem I/F 218 is an interface for connecting the modem 223 and the control unit 210. The modem 223 communicates the image data via facsimile with a facsimile apparatus on a public switched telephone network (PSTN). The network I/F 219 is an interface for connecting the control unit 210 (MFP 110) to the LAN. The MFP 110 transmits image data and information to each service on the Internet and receives various information via the network I/F 219.

Figure 3:
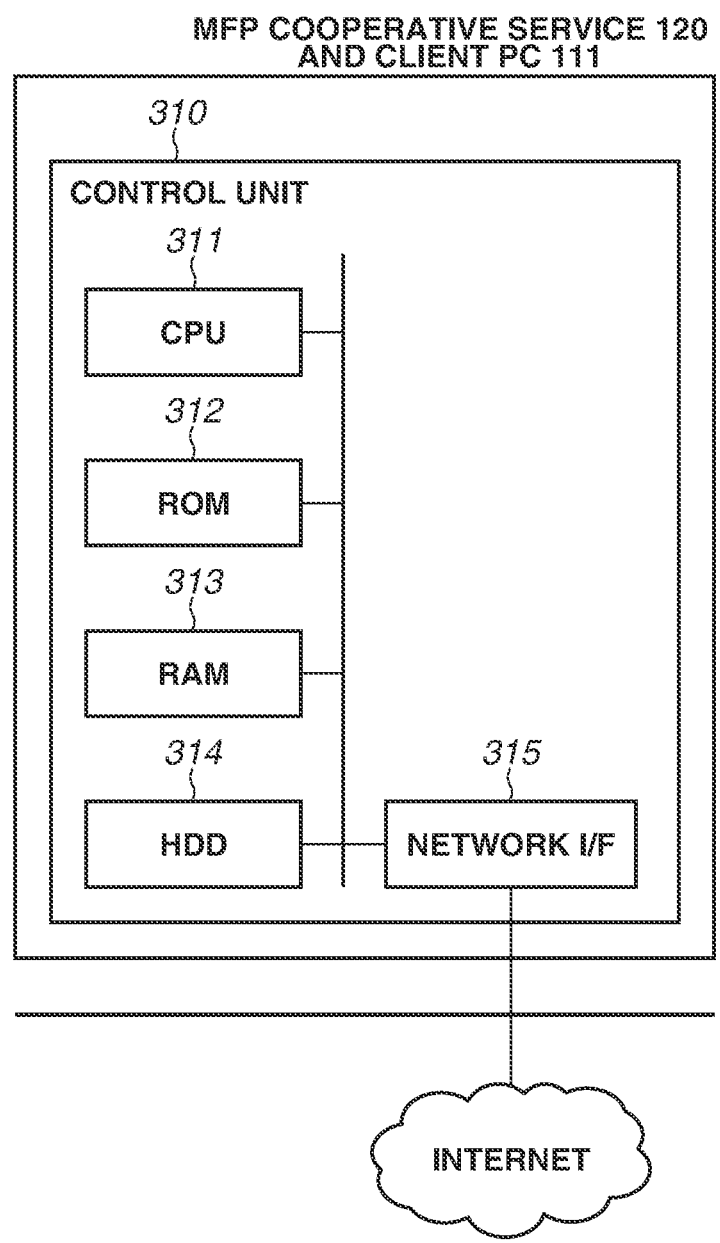
FIG. 3 is a block diagram illustrating a hardware configuration of a client personal computer (PC) and an MFP cooperative service.

FIG. 3 is a block diagram illustrating a hardware configuration example of an information processing apparatus that can function as the client PC 111 or the MFP cooperative service 120. The client PC 111 and the MFP cooperative service 120 each include a CPU 311, a ROM 312, a RAM 313, an HDD 314, and a network I/F 315. The CPU 311 reads out control programs stored in the ROM 312 and executes various processes, thereby controlling the overall operation. The RAM 313 is used as a temporary storage area such as a main memory or a work area for the CPU 311. The HDD 314 is a large capacity storage unit for storing image data and various programs. The network I/F 315 is an interface for connecting the MFP cooperative service 120 to the Internet. The MFP cooperative service 120 and the cloud storage 130 transmit and receive various information in response to a process request from another apparatus (such as the MFP 110) via the network I/F 315.

Figure 4:
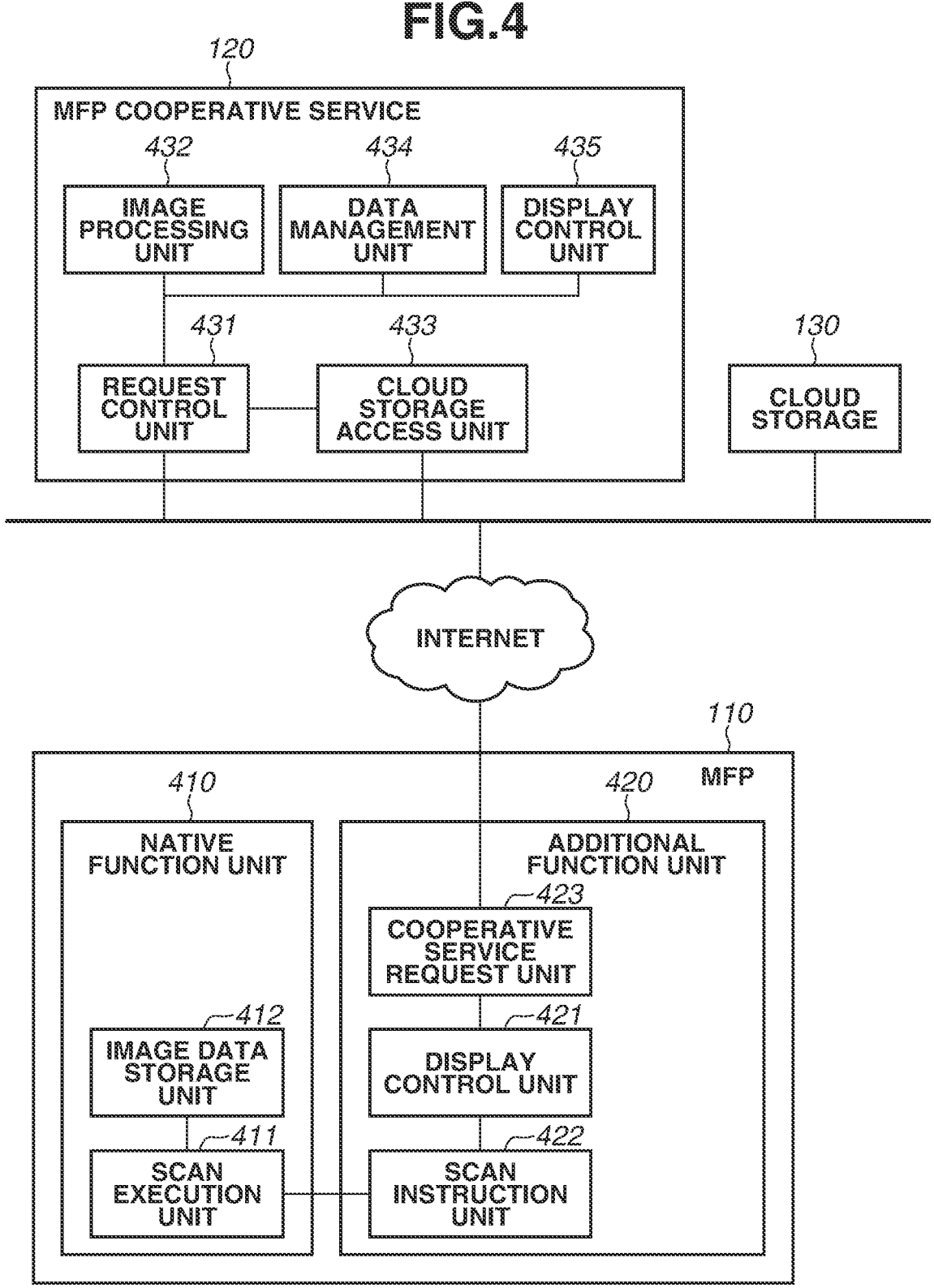
FIG. 4 is a block diagram illustrating a software configuration of the system.

FIG. 4 is a block diagram illustrating a software configuration example of the image processing system according to the present exemplary embodiment. The MFP 110 is roughly divided into to two units, i.e., a native function unit 410 and an additional function unit 420. Each processing unit included in the native function unit 410 is a processing unit associated with standard functions of the MFP 110. On the other hand, the additional function unit 420 is an application to be additionally installed in the MFP 110. The additional function unit 420 is, for example, an application based on Java®. The additional function unit 420 makes it possible to easily add a function to the MFP 110. Other additional applications (not illustrated) may also be installed in the MFP 110.

The native function unit 410 includes a scan execution unit 411 and an image data storage unit 412. The additional function unit 420 includes a display control unit 421, a scan instruction unit 422, and a cooperative service request unit 423.

The display control unit 421 displays a user interface (UI) screen for receiving an operation performed by the user on a liquid crystal display unit having a touch panel function of the operation unit 220 of the MFP 110. For example, the display control unit 421 displays a UI screen for, for example, inputting authentication information for accessing the MFP cooperative service 120, making a scan setting, performing an operation to start scanning, or displaying a preview screen. The scan instruction unit 422 sends a scan process request to the scan execution unit 411 together with the scan setting instructed by the user via the UI screen.

The scan execution unit 411 receives the scan request including the scan setting from the scan instruction unit 422. The scan execution unit 411 causes the scanner unit 222 to scan a document placed on the platen glass via the scanner I/F 217 in response to the received scan request, thereby generating scanned image data. The generated scanned image data is sent to the image data storage unit 412. The scan execution unit 411 sends a scanned image identifier uniquely indicating the stored scanned image data to the scan instruction unit 422. The scanned image identifier is, for example, a number, a symbol, or an alphabet (not illustrated) for uniquely identifying each scanned image in the MFP 110. The image data storage unit 412 stores the scanned image data received from the scan execution unit 411 in the HDD 214.

The scan instruction unit 422 obtains, from the image data storage unit 412, the scanned image data corresponding to the scanned image identifier received from the scan execution unit 411. The scan instruction unit 422 requests the cooperative service request unit 423 to transmit an instruction to perform a process on the obtained scanned image data in the MFP cooperative service 120.

The cooperative service request unit 423 sends various process requests to the MFP cooperative service 120. Examples of the process requests include a login request, a scanned image analysis request, and a scanned image transmission request. To exchange information with the MFP cooperative service 120, a protocol such as Simple Object Access Protocol (SOAP) or Representational State Transfer (REST) is used. Any other communication method may also be used.

The MFP cooperative service 120 includes a request control unit 431, an image processing unit 432, a cloud storage access unit 433, a data management unit 434, and a display control unit 435.

The request control unit 431 is in a standby state for receiving a request from an external apparatus. Upon receiving a process request, the request control unit 431 issues a process instruction to the image processing unit 432, the cloud storage access unit 433, and the data management unit 434, as needed, in response to the received request.

The image processing unit 432 performs an image recognition process and an image processing process, such as rotation and tilt correction, character region analysis, optical character recognition (OCR), or similar business form determination (to be described below in step S510 of FIG. 5) on each image.

The cloud storage access unit 433 issues a request for a process on the cloud storage 130. General cloud services release various interfaces for storing a file in a cloud storage and obtaining a stored file via a protocol such as REST or SOAP. The cloud storage access unit 433 performs an operation on the cloud storage 130 using the released cloud storage interfaces.

The data management unit 434 holds user information, various setting data, and the like managed by the MFP cooperative service 120.

The display control unit 435 receives a request from an application such as a web browser running on another terminal (not illustrated) such as a PC or a mobile device connected via the Internet, and sends screen configuration information (HyperText Markup Language (HTML), Cascading Style Sheets (CSS), etc.) for screen display. The user can check user information registered in the MFP cooperative service 120 via a screen displayed on the web browser, and can change settings for scanning.

While FIG. 4 illustrates an example of the configuration in which the additional function unit 420 is installed in the MFP 110, the present exemplary embodiment is not limited to this example. The client PC 111 may include the function of the additional function unit 420.

Figure 5:
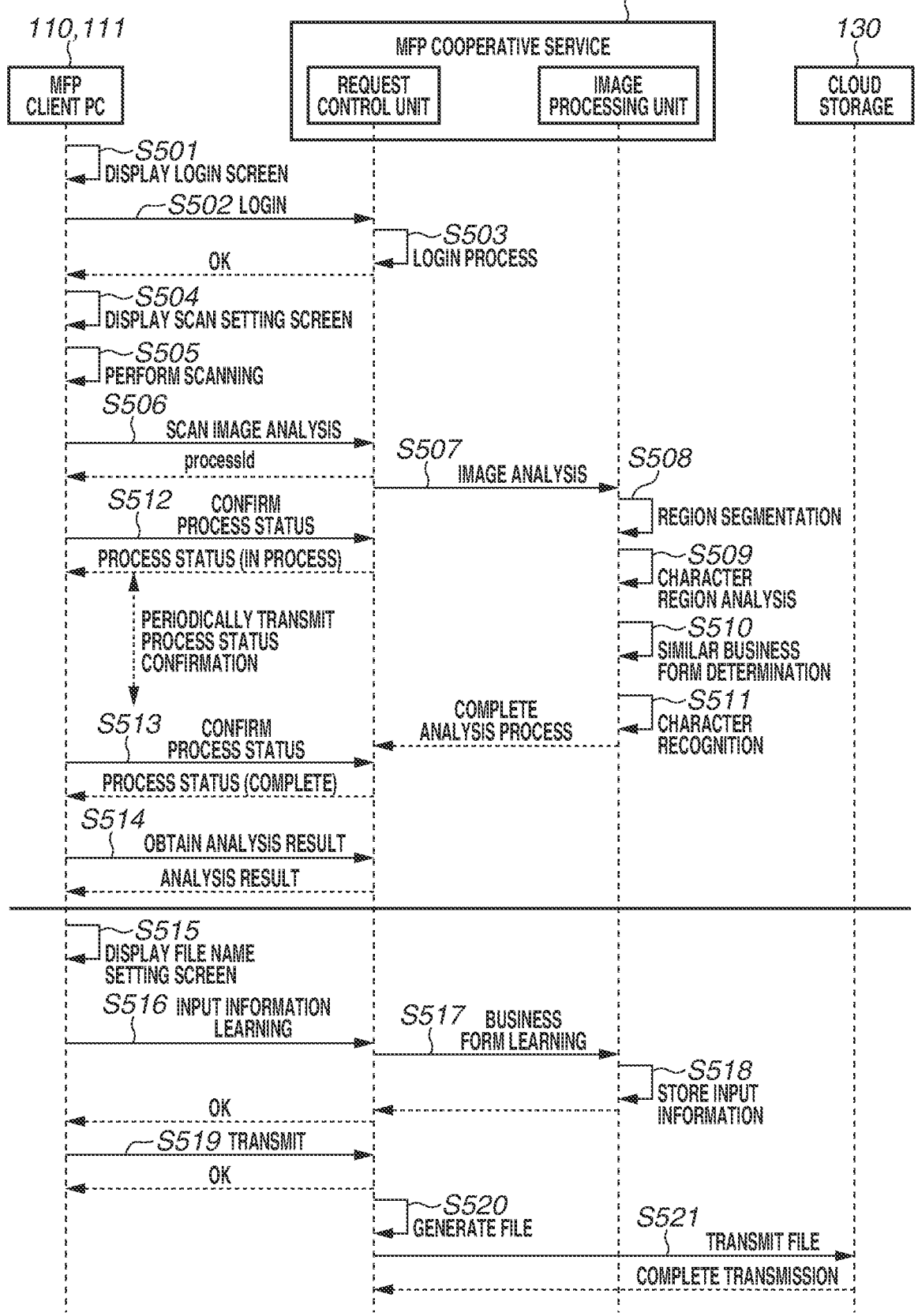
FIG. 5 is a sequence diagram illustrating a process flow among apparatuses.

FIG. 5 is a sequence diagram illustrating a process flow among apparatuses when the MFP 110 transmits a scanned image to the MFP cooperative service 120, saves the scanned image into a file, and stores the file in the cloud storage 130. Information exchange among the apparatuses will be mainly described. FIG. 5 illustrates an example where the MFP 110 exchanges information with the MFP cooperative service 120. However, the obtainment of an image analysis result to be described below, display of screens, and issuance of a learning instruction, and the like may be executed by the client PC 111 instead of the MFP 110.

In a normal state, the MFP 110 displays a main screen on which buttons for carrying out, for example, copy, print, and scan functions are arranged on the touch panel.

An additional application (hereinafter referred to as a scan application) for transmitting a scanned business form to the cloud storage 130 is installed into the MFP 110, thereby displaying a button used for application functions on the main screen of the MFP 110. When this button is pressed, a screen for transmitting the scanned business form to the cloud storage 130 is displayed and processes illustrated in the sequence diagram of FIG. 5 are carried out.

In step S501, the scan application displays a login screen for inputting authentication information for accessing the MFP cooperative service 120. In step S503, the MFP cooperative service 120 verifies whether a user name and a password included in the login request are correct, and if the user name and the password are correct, the MFP cooperative service 120 returns an access token to the MFP 110. Various requests to be issued from the MFP 110 to the MFP cooperative service 120 in subsequent processes can be sent together with an access token, and a process target user can be identified based on the information. The user is authenticated using a generally known method (e.g., basic authentication, digest authentication, or Open Authorization (OAuth)).

After completion of the login process, the MFP 110 displays a scan setting screen in step S504.

The user makes settings about various scan reading processes, places a paper business form to be scanned on the platen glass or ADF, and presses a "scan start" button to execute the scan process in step S505 to generate image data obtained by digitizing the paper business form. Further, in step S506, the image generated by the scan process and a scanned image analysis request are transmitted to the MFP cooperative service 120. Upon receiving the scanned image analysis request, the MFP cooperative service 120 starts the image analysis in the image processing unit 432 of the MFP cooperative service 120 in step S507. The MFP cooperative service 120 returns "processId," which is an identifier for uniquely identifying the requested image analysis process, to the MFP 110 without waiting for completion of the image analysis process.

In the image analysis process executed by the image processing unit 432, first, in step S508, the image is segmented into regions, such as characters, tables, or figures, which are included in the image, and layout information about each region is obtained. Known methods can be used as the region segmentation method. Next, in step S509, each character region segmented in step S508 is analyzed and is segmented into a printed character region and a handwritten character region including handwritten characters or handwritten symbols. Printed characters and handwritten characters are determined based on, for example, the size or shape of connected pixels, or a distribution of densities of connected pixels. A circled character is segmented into a partial region corresponding to a circled handwritten symbol written by handwriting and a partial region corresponding to a printed character (preprinted portion) present in the circled region. The method for determining handwritten characters or symbols and preprinted characters or symbols is not limited to the above-described method. For example, handwritten characters, printed characters, and a background may be determined in units of pixels using a learning model obtained by an artificial intelligence (AI).

In step S510, layout information about a previously scanned image is compared with layout information about a currently scanned image by using the layout information (layout) about each character region in the business form, and it is determined whether an image (business form image) having a similar layout of character regions is scanned. This process is referred to as a similar business form determination (or similar image recognition). While the present exemplary embodiment illustrates an example where a similar business form is determined based on the layout of character regions, the similar business form determination method is not limited to this example. Information about previously scanned images used for the similar business form determination is stored and accumulated in the process of step S518 to be described below. After that, in step S511, a character recognition process is performed on the analyzed region based on the determination result.

In step S512, the MFP 110 uses "processId" received in the response in step S506 to periodically (e.g., every several hundred milliseconds or every several milliseconds) conform the process status of image analysis on "processId" to the MFP cooperative service 120. The process of step S512 is continuously performed until a response indicating the completion of the image process in the MFP cooperative service 120 is received (until step S513). Upon receiving the process status confirmation request in step S512, the MFP cooperative service 120 confirms the status of the process on "processId", and returns a response.

A character string indicating the current process status is stored as "status" in the response. For example, if "processing" is stored as "status", the status indicates that the MFP cooperative service 120 is in process, and if "completed" is stored as "status", the status indicates that the process is completed. Additionally, for example, if the process is unsuccessful, "failed" or the like may be returned as the status. The response to be issued upon completion of the process (the status indicates "completed") includes information indicating, for example, the scanned image analysis result or scan settings, as well as the status.

Upon detection of the completion of the process in step S513, the MFP 110 accesses a Uniform Resource Locator (URL) included in the response in step S512, and obtains result information stored in the destination indicated by the URL.

In step S515, a file name setting screen for setting a file name using the result information obtained in step S514 is displayed. FIG. 6B illustrates an example of a file name setting screen 610 displayed on the MFP 110. Processes to be performed on the file name setting screen 610 will be described in detail below.

On the file name setting screen 610, when a character region to be used for the file name is selected by the user on the scanned image displayed on a preview region 612, character recognition results of selected character regions are sequentially displayed on a file name region 611 in the selected order. The file name to be assigned to the scanned business form is determined by selecting all desired character regions. Then, when an OK button 617 is pressed, information about the character regions used to set the file name in step S516 is transmitted to the MFP cooperative service 120 to request for a learning process. In step S517, the request control unit 431 of the MFP cooperative service 120 that has received the request for the learning process requests the image processing unit 432 to learn the business form. In step S518, the image processing unit 432 stores information about character regions in the entire image and information about the character regions that is used for the file name by the user and is received in step S516. This process will be described in detail with reference to FIGS. 9 and 14.

In step S519, the MFP 110 transmits the scanned image and information such as the file name set for the scanned image to the MFP cooperative service 120, and sends a request for storing the information in a file. The learning request in step S516 and the storage request in step S519 may be simultaneously made. Upon receiving the request, the MFP cooperative service 120 starts a file generation process and sends a response indicating that the request has been normally received to the MFP 110. Upon receiving the transmission response, the MFP 110 terminates the process and the processing returns to the scan setting screen display in step S504.

In step S520, the MFP cooperative service 120 obtains information about a file format to be transmitted to the cloud storage 130 from the scan settings registered in the MFP cooperative service 120 and generates a file from the scanned image based on the settings. In step S521, the file name received in step S519 is assigned to the generated file and the file is transmitted and stored in the cloud storage 130.

FIGS. 6A and 6B each illustrate an example of a screen displayed on the MFP 110 (or client PC 111). FIG. 6A illustrates an example of a scanned business form list screen 600. This screen enables the user to browse a list of business form images before being transmitted to the cloud storage 130 after the scanning and image analysis process are completed. This screen is composed of a scanned business form list 601, a transmit button 602, an edit button 603, and a delete button 604. The scanned business form list 601 is a screen for displaying a list of business forms on which the scanning and image analysis process (steps S505 to S511) are completed. This screen includes a business form name 605, a destination 606, a status 607, and a type 608. The business form name 605 is an identifier for uniquely identifying the name of each business form. The destination 606 corresponds to the name of the cloud storage 130 to which the business form file is transmitted. The status 607 indicates the result of the similar business form determination on the business form image. One of "not-yet-learned" and "learned" is displayed as the status 607. The status "not-yet-learned" indicates that it is determined that no similar business form is present, and the status "learned" indicates that it is determined that a similar business form is present. The type 608 indicates the type of each business form. For example, "estimate" or "invoice" is displayed as the type 608. For each business form indicated by "learned" in the status 607, a detailed invoice format type, such as "invoiceAAA" or "invoiceBBB", is also displayed. This is information associated with the most similar business form determined by the similar business form determination process.

For example, if the character recognition process is performed on a title displayed at an upper portion of a business form image and the type of the business form can be identified, a type, such as an estimate, is also displayed for each not-yet-learned business form. The transmit button 602 is a button for transmitting the business form to the cloud storage 130. Any business form is selected from the scanned business form list 601, and the transmit button 602 is pressed to transmit the business form to the cloud storage 130 displayed on the destination 606. If the transmission is normally completed, the business form is deleted from the list. The edit button 603 is a button for shifting to the file name setting screen 610 to be described below. Any business form is selected from the scanned business form list 601, and the edit button 603 is pressed to shift to the file name setting screen 610 for the selected business form. The delete button 604 is a button for deleting a business form. Any business form can be selected from the scanned business form list 601, and when the delete button 604 is pressed, the selected business form can be deleted.

FIG. 6B illustrates an example of the file name setting screen 610. The file name region 611 is a region for displaying the file name set by the user. When the user touches a blank area on the file name region 611, a software keyboard is displayed to thereby enable the user to input any character. In a case where a file name is set and a character string is displayed, when the user touches the character string, a software keyboard for correcting the character string corresponding to the touched portion is displayed and the input character can be corrected. The preview region 612 displays a scanned image.

When the user touches the character region in the displayed scanned image, the character recognition result of the character region corresponding to the touched position can be added to the file name. In this case, the selected character region may be displayed by adding a shape, such as a line or a border line, a color, or the like to the selected character region so that the selected character region can be easily recognized by the user. If a plurality of character regions is selected, the character regions may be displayed with different colors, respectively. In addition, a preview display position or a magnification may be changed so that the selected character region can be located at the center of the screen. If a plurality of character regions is present, the preview display position may be calculated so that a number of character regions corresponding to a preset number of regions can be displayed. For example, the display position and magnification are changed so that a central portion of each of an uppermost region and a lowermost region in the regions used for the file name is located at the center in a longitudinal direction of the preview region 612, and then a preview image is displayed. When the user touches the selected character region again, the character region is put into an unselected state and the character string of the corresponding file name is deleted to thereby bring the character string into the original state in which the character string is not provided with a line, a color, or the like. The present exemplary embodiment illustrates an example where when no character string is selected, the character region is not displayed on the preview image. However, the character region may be displayed with a color or a border line so that the user can recognize which character region can be touched. In addition, the display for enabling the user to recognize the character region may be configured to be switched between a display state and a non-display state using a button. If a swipe operation is performed on the preview region, the position of the image to be displayed on the preview region can be moved. On the scanned image illustrated in FIG. 6B, for convenience of illustration, hidden words (e.g., "BB BB" or "XXXX, YYYY, ZZZZ") are used as a part of the name and address input by the user. In practice, however, the character image of the handwritten name and address is displayed.

A "file name delete" button 613 is used to delete the character corresponding to the character region added to the end of the file name. A "preview scale-up" button 614 is used to increase the magnification of the image displayed on the preview region. A "preview scale-down" button 615 is used to reduce the magnification of the image displayed on the preview region. During scaling-up or scaling-down, the display position is adjusted so that the coordinates of the center of the preview region match the coordinates before the image is scaled up or scaled down. A "preview initial display" button 616 is used to reset the magnification and display position to the default magnification and display position when the display position of the preview image is moved by swiping, or when the magnification for display is changed by pressing the preview scale-up button 614 or the preview scale-down button 615. When the OK button 617 is pressed, the scanned image and the file name set on the file name setting screen 610 are transmitted to the MFP cooperative service 120 and the learning process (steps S516 to S518) is executed. When the transmission is completed, the screen returns to the scanned business form list screen 600.

FIG. 7 is a flowchart illustrating details of the character recognition process performed by the image processing unit 432 in the image processing system. This process flow corresponds to step S511 illustrated in FIG. 5.

If a business form is input, the input image region segmentation (step S508) and the character region analysis (step S509) are carried out to obtain a character region group in the business form. After that, the similar business form determination (step S510) is carried out. As a result of determination, if it is determined that a similar business form is present in step S701 (YES in step S701), the processing proceeds to step S702. In step S702, the character region in the target business form corresponding to the character region registered in the similar business form found is obtained. In step S703, the character region to be presented to the user is determined from the corresponding character region obtained in step S702, and the character recognition process is performed on the determined character region, to thereby extract character strings. By this process, the file name that seems to be desired by the user in the target business form is presented based on file name setting rules for the similar business form. Step S703 will be described in detail below. After that, in step S704, the analysis result is added to a learned business form storage region.

Lastly, in step S705, a notification of the learned business form is provided to the request control unit 431, and then the process flow is terminated. On the other hand, if no similar business form is found in step S701 (NO in step S701), the processing proceeds to step S706. In step S706, the character recognition process is performed on all character regions in the business form to extract character strings. In this case, the character recognition process is performed on all character regions. This is because it is determined that no similar business form is present and the region to be used for setting the file name is unknown. Then, in step S707, the analysis result is added to a not-yet-learned business form storage region, and a notification of the not-yet-learned business form is provided in step S708.

Figure 8A:
FIG. 8A, consisting of FIGS. 8A1 and 8A2, and 8B, consisting of FIGS. 8B1 and 8B2, each illustrate an example of a data structure stored in the character recognition process and an input information storage process performed by the image processing unit in the system.
Figure 8B:
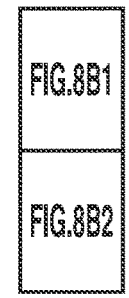

FIGS. 8A and 8B each illustrate an example of a data structure stored in the character recognition process and an input information storage process performed by the image processing unit 432 in the image processing system.

FIG. 8A illustrates an example of a data structure of learning data stored in the input information storage process of step S518 by the image processing unit 432. A value "formId" is added to manage business form data stored in the MFP cooperative service 120. In "learningContent", information indicating input information used for the file name is set. In "rectInfoArray", a number of pieces of coordinate information about character regions used for the file name corresponding to the number of used character regions are set. Each character region includes pieces of information "type", "rect", and "relatedInfo". The "type" information indicates the type of the character region. As the "type" information, "printing" indicates a printed character and "handwritten" indicates a handwritten character. The "rect" information indicates the position and size of the character region. In the "rect" information, "x" indicates an X-coordinate of an upper left position in the region, "y" indicates a Y-coordinate of an upper left position in the region, "width" indicates the number of pixels in an X-direction of the region, and "height" indicates the number of pixels in a Y-direction of the region. The "relatedInfo" information indicates a region associated with the character regions used for the file name as described in detail below. If the character region includes "text" information, the "text" information indicates characters extracted as a result of performing the OCR and character recognition process on the character region indicated by "rect". In "metadataArray", information indicating the order of character regions and separator characters set for the file name. In the example illustrated in FIG. 8A, "fileRegion0", "separator", "fileRegion1", "separator", and "fileRegion2" are set. A user operation based on this setting is described below with reference to FIG. 6B. On the file name setting screen 610, "APPLICATION", "BB BB", and "F" are touched in this order and then the OK button 617 is pressed. The image processing unit 432 accumulates this information and this information is used in the subsequent similar business form determination. Information to be learned in the learning process when the user selects a circled printed character string will be described in detail below.

FIG. 8B illustrates an example of a data structure indicating the result of the similar business form determination process and the result of the file name to be presented to the user. In "matched", a value indicating whether a business form similar to the previously scanned image is found in the similar business form determination performed on the analysis target image is stored. In "formId", a value uniquely indicating a similar business form if the similar business form is present is stored. If there is no similar business form, a value used to learn input information about the scanned image in step S516 is stored. In "matchingScore", a value indicating a degree of similarity in a case where there exists a similar business form is stored. In "matchingScore", the degree of coincidence between layout information about the previously scanned image and layout information about the currently scanned image is expressed using real values ranging from "0" to "1". In this case, a larger value indicates a business form with a higher degree of similarity. In "rectInfoArray", information indicating the character region in the current analysis target image corresponding to the character region previously used by the user during setting of the file name for the similar business form is stored.

FIG. 8B illustrates a state where another image (e.g., an image illustrated in FIG. 11B) is scanned and the scanned image is determined to correspond to the similar business form illustrated in FIG. 6B as a result of performing the similar business form determination using the learning result (FIG. 8A) based on the setting of the file name for the image illustrated in FIG. 6B, the character recognition result for the character string region present at the position corresponding to the character string region used for setting the file name for the image illustrated in FIG. 6B is stored as information to be automatically input.

<Learning Process and Recommendation Process According to First Exemplary Embodiment>

A configuration example and an overall process flow of the image processing system according to the present exemplary embodiment have been described above. A business form learning process and a file name recommendation process performed by the image processing unit 432 according to a plurality of exemplary embodiments will be described in detail below.

First, the business form learning process to be performed according to the first exemplary embodiment when a document including a circled printed character string is scanned and the user designates the circled printed character string as a character string region used for the file name on the displayed scanned image will be described.

Like in the related art, if the position of a region designated by the user is learned in advance and the recognition result of the character string corresponding to the learned position is output when a similar document is scanned, the following issue is raised. That is, in the similar document, even if another character string different from the character string corresponding to the learned position is circled, the character string that is not circled and corresponds to the learned position is output.

On the other hand, in the business form learning process according to the first exemplary embodiment, when a character string region used for the file name is designated by the user, it is determined whether the designated character string region is a region including a circled character or symbol. If it is determined that the designated character string region is a region including a circled character or symbol, it is determined whether a peripheral character string region can be used as another option for a circled character or symbol, and then the determined region is learned. The learning process according to the first exemplary embodiment will be described in detail below.

FIG. 9 is a flowchart illustrating an example of the input information storage process in step S518 performed by the image processing unit 432 in the business form learning process according to the first exemplary embodiment. This process flow is executed when at least one character string region to be set for the file name (this region is hereinafter referred to as a learning region) is selected by a user operation on the file name setting screen 610 and the OK button 617 is pressed.

First, in step S901, information about a learning region (character string region) selected by a user operation is obtained. In this case, information (such as positional information about each region in the business form image and character recognition results) about regions analyzed in steps S508, S509, and S511 is also obtained. In step S902, it is determined whether the obtained business form is a business form including at least one of a handwritten character region and a handwritten symbol region. This determination can be made with reference to the results of the previous processes, i.e., the region segmentation process in step S508 and the region analysis process in step S509. If the obtained business form includes no handwritten character or symbol region (NO in step S902), the processing proceeds to step S908. In step S908, positional information about the learning region is stored (learned) as positional information about the character region to be output. In this case, the learning region is a printed character region including no handwritten character or symbol region.

On the other hand, in step S902, if it is determined that the obtained business form is a business form including the handwritten character or symbol region (YES in step S902), the processing proceeds to step S903. In step S903, it is determined whether the learning region to be processed corresponds to a printed character region using a single learning region as a region to be processed. In step S903, if it is determined that the learning region does not correspond to a printed character region (NO in step S903), the processing proceeds to step S911. Since the learning region is a character region including handwritten characters, in step S911, the positional information about the learning region to be processed is stored (learned) as the positional information of the character region to be output. In this case, since the learning region is a handwritten character region, the learning region may be stored as a region to be subjected to the handwritten character recognition process.

On the other hand, in step S903, if it is determined that the learning region corresponds to a printed character region (YES in step S903), the processing proceeds to step S904. In step S904, a process for searching for and obtaining a most similar handwritten character region (handwritten character or symbol region) within a certain distance is performed.

In step S905, it is determined whether a handwritten character region is found within a certain distance as a result of the process of step S904. If no handwritten character region is found within a certain distance (NO in step S905), there is no handwritten character region associated with the learning region, and thus the processing proceeds to step S908. In step S908, the learning region to be processed is stored (learned) as a printed character region.

On the other hand, if it is determined that a handwritten character region is found within a certain distance in step S905 (YES in step S905), the processing proceeds to step S906. In step S906, the closest handwritten character region found is stored as learning data associated with the learning region to be processed. For example, if a handwritten character region that surrounds the learning region is found, the learning region can be estimated as the printed character region selected with a handwritten symbol. Further, in step S907, a peripheral printed character region of the learning region to be processed is searched and character strings in the printed character region found are also stored as related learning data. This peripheral printed character region is treated as a candidate option that can be selected with a handwritten symbol. In step S908, the learning region to be processed is determined to be a printed character region and is stored (learned) in association with the information stored in steps S906 and S907.

In step S909, it is determined whether learning regions selected by the user include another learning region to be processed. If it is determined that there is another learning region to be processed (YES in step S909), the processing returns to step S902 in which one of the unprocessed learning regions is used as a region to be processed. If it is determined that all learning regions selected by the user are stored (learned) (NO in step S909), the processing proceeds to step S910. In step S910, the processed business form image is notified as the learned business form, and then the process flow is terminated.

Figure 10:
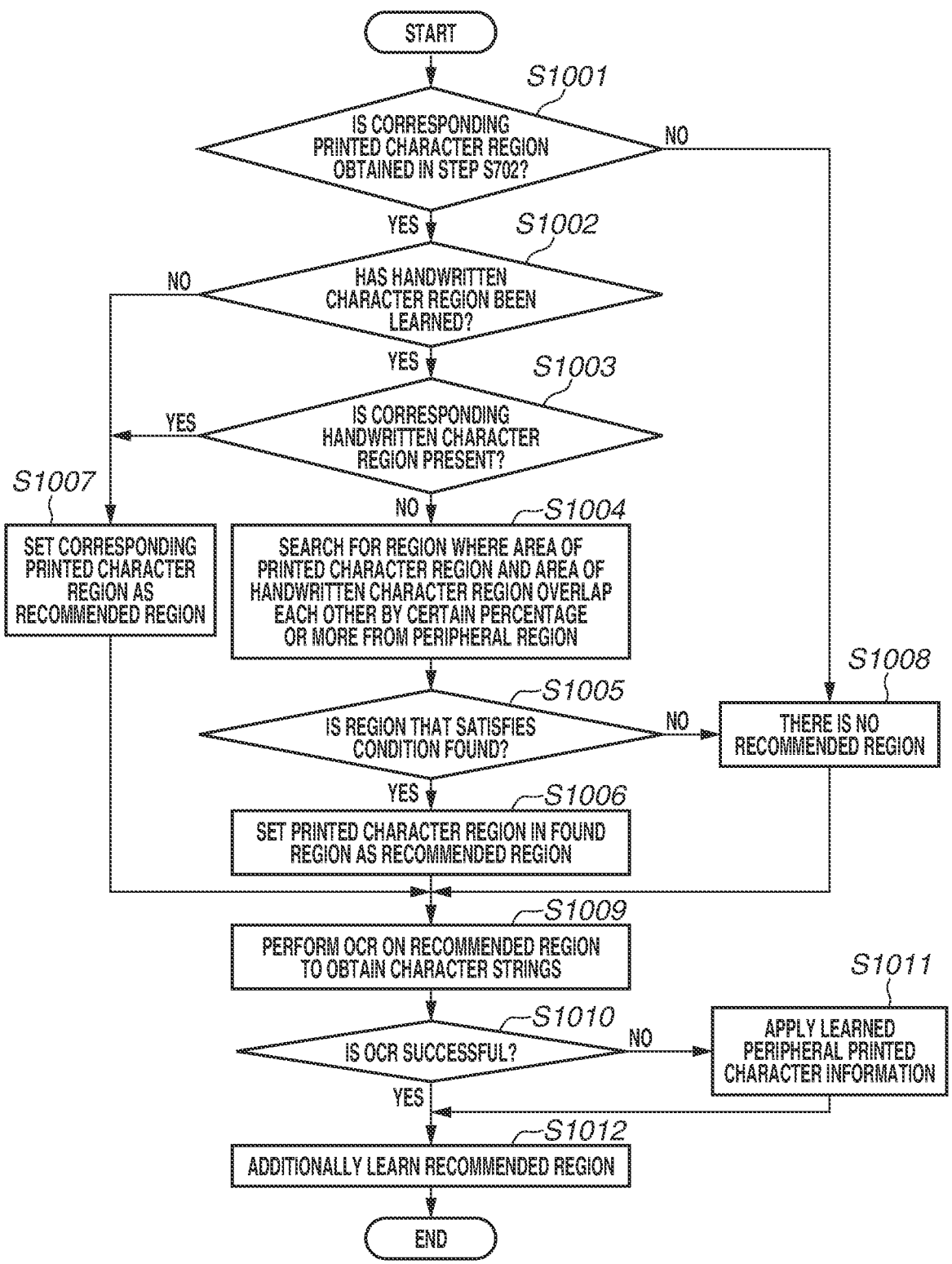
FIG. 10 is a flowchart illustrating an example of a recommendation process of recommending a file name to be presented to a user.

Next, the recommendation process for automatically generating a file name candidate and presenting the file name candidate to the user when a document of a format that is the same as the format of the learned business form is scanned after the above-described learning process illustrated in FIG. 9 is carried out will be described with reference to FIG. 10. The processing illustrated in FIG. 10 is executed by the image processing unit 432 and corresponds to the detailed process of step S703 illustrated in FIG. 7. A character region used to generate a file name to be presented to the user is hereinafter referred to as a "recommended region".

First, in step S1001, it is determined whether the printed character region corresponding to the learning region in the similar business form is obtained from the currently scanned business form image in step S702 illustrated in FIG. 7, which is a process performed immediately before this process. If there is no corresponding printed character region (NO in step S1001), the processing proceeds to step S1008. In step S1008, it is determined that there is no recommended region. If the corresponding printed character region is present (YES in step S1001), the processing proceeds to step S1002. In step S1002, it is determined whether a handwritten character region is learned as the region associated with the printed character region. This determination is made based on whether information "relatedInfo" is contained in the region including target "key" information with reference to the learning data illustrated in FIG. 8A.

In step S1002, if it is determined that the associated handwritten character region is not learned (NO in step S1002), which indicates that the region selected by the user in the previously scanned image is, for example, a character region that is not circled, and thus the processing proceeds to step S1007. In step S1007, the corresponding printed character region is set as the recommended region.

On the other hand, in step S1002, if it is determined that the associated handwritten character region is learned (YES in step S1002), the processing proceeds to step S1003. In step S1003, it is determined whether the handwritten character region corresponding to the learned handwritten character region is present in the currently scanned business form image. If the corresponding handwritten character region is present (YES in step S1003), the processing proceeds to step S1007. In this case, both the printed character region corresponding to the learning region and the handwritten character region corresponding to the learned handwritten character region are present. Therefore, it can be determined that the same item is selected with a handwritten circle in the learned business form and a newly processed business form. Accordingly, in step S1007, the printed character region corresponding to the learning region is set as the recommended region.

On the other hand, in step S1003, if it is determined that the handwritten character region corresponding to the learned handwritten character region is not present in the newly scanned image (NO in step S1003), a circled printed character may be present in another area, and thus the processing proceeds to step S1004. In step S1004, a peripheral region is searched. In this case, a region where a printed character region and a handwritten character region overlap each other by a certain area or more is searched. This search may be performed by determining whether the printed character region and the handwritten character region are present in the vicinity of the learned position if the position of the peripheral printed character region is learned in step S907. Step S1004 will be described in detail below with reference to an example illustrated in FIG. 11. Based on the search result, in step S1005, it is determined whether a region that satisfies a condition is found. If the region that satisfies the condition is not found (NO in step S1005), the processing proceeds to step S1008. In step S1008, it is determined that there is no recommended region. On the other hand, if the region that satisfies the condition is found (YES in step S1005), the processing proceeds to step S1006. In step S1006, the printed character region in the combination of the printed character region found and the handwritten character region found is set as the recommended region.

The processes of steps S1001 to S1008 are performed on all learning regions in the similar business form. Then, in step S1009, the OCR process is performed on the recommended region to obtain character strings. In step S1010, it is determined whether the OCR process in step S1009 is successful. In step S1010, if it is determined that the OCR process is unsuccessful (NO in step S1010), the processing proceeds to step S1011. In step S1011, if the character string in the printed character region corresponding to the recommended region is learned, the character string is applied. The character string in the printed character region corresponding to the recommended region is learned by storing the character string in the printed character region in steps S907 and S908 illustrated in FIG. 9. Lastly, in step S1012, if the recommended region is a region that is not learned, the region is additionally learned and then the process flow is terminated.

FIGS. 11A to 11D each illustrate a specific example of the learning process according to the first exemplary embodiment and a specific example of the file name recommendation process.

Figure 11A:
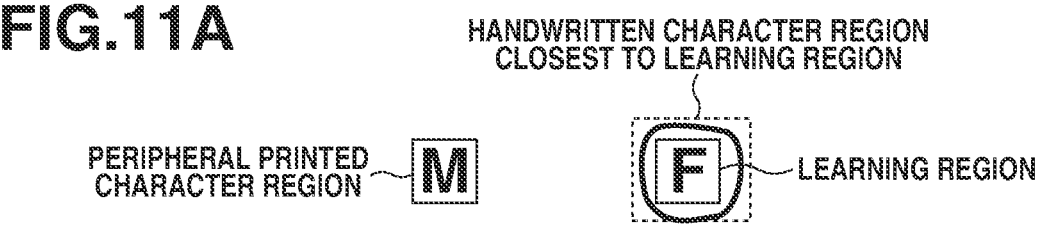
FIGS. 11A to 11D each illustrate a specific example of using a region corresponding to a circled printed character string as a file name.

The learning process is performed as follows. First, the user scans a business form including handwritten characters, selects the target business form image, opens the file name setting screen 610, and touches the image corresponding to the business form to set the file name. Assume that the file name to be set in this case is "APPLICATION_BB BB_F" obtained by sequentially selecting a plurality or regions as illustrated in FIG. 6B. Positional information about each selected region is stored. A process for storing information associated with "F" (female) as a circled printed character will be described in detail below. In FIGS. 11A, 11C, and 11D to be described below, each printed character region is represented by a solid rectangle and each handwritten character region is represented by a dashed rectangle.

FIG. 11A illustrates information about a region stored in the input information storage process in step S518. Since the user has selected the region corresponding to the character string "F", in step S908, the printed character region is stored as the learning region. This business form is a business form including a handwritten character. Accordingly, the closest handwritten character region is obtained in step S904, and information about the handwritten character region is stored in step S906. In this case, the closest handwritten character region corresponds to the region including the circled printed character "F". Further, a peripheral printed character region is searched and the printed character region indicating "M" is present near the region. Accordingly, in step S907, this printed character region and the character string information are stored. Thus, in steps S906, S907, and S908, three types of information are stored when the character string "F" is selected.

Figure 11B:
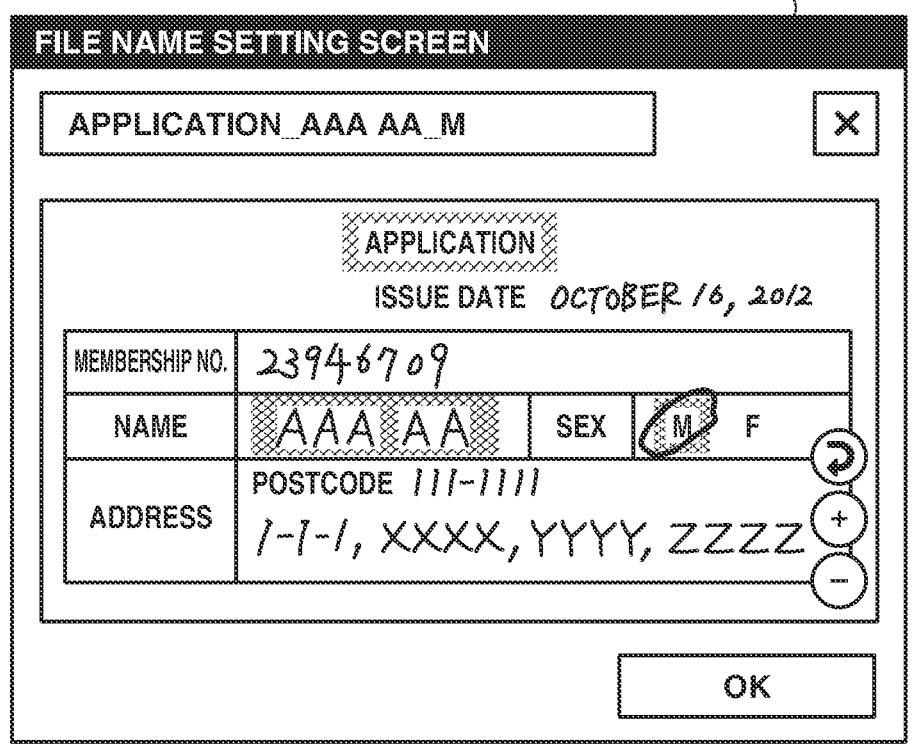
Figure 11C:
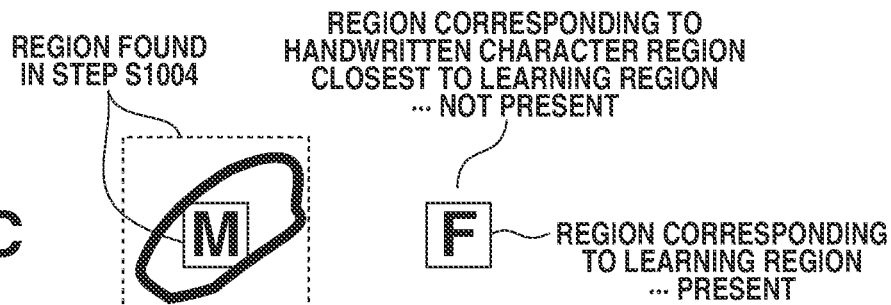
Figure 11D:

In this manner, after the information illustrated in FIGS. 6B and 11A is learned, a new business form of the same layout is scanned as illustrated in FIG. 11B. In the scanned image illustrated in FIG. 11B, a part of the name and address is indicated by hidden words for convenience of illustration. In practice, however, character strings written by the user are displayed. Assume that, in this new business form, the character string "M" is selected with a handwritten circle, unlike in the learned business form. As illustrated in FIG. 11B, in this case, a file name "APPLICATION_AAA AA_M" is presented to the user. Since character strings "APPLICATION" and "AAA AA" are included in the regions corresponding to "APPLICATION" and "BB BB" learned in the input information storage process, the character strings are directly presented to the user. However, as illustrated in FIG. 11C, the printed character region corresponding to the region "F" learned in the input information storage process is present in the new business form image, while the handwritten character region corresponding to the handwritten character region learned as the related region in step S906 is not present in the new business form image. Accordingly, the processing proceeds to step S1004, and the region where the printed character region and the handwritten character region overlap each other by a certain percentage or more is searched in the peripheral region. As a result of this search, it is found that there are regions (two regions, i.e., "M" printed character region and circled handwritten character region) including the circled character string "M". The searched handwritten character region includes a printed character region. In other words, the area of the printed character region overlaps the entire area of the handwritten character region. Thus, it is obvious that the search condition is satisfied. Therefore, in step S1006, the printed character region, which is one of the found regions, is determined to be the recommended region. In step S1009, the OCR process is performed, and the character string "M" is presented as a character string constituting a part of the file name.

In the example illustrated in FIG. 11D, a circled symbol is added to the character string "M". However, this indicates that the circled symbol partially overlaps the printed character and the character string "M" cannot be recognized in the character recognition process in step S1009 (NO in step S1010). In this case, in step S1004, the printed character region and the handwritten character region have a similar positional relationship, like in the case of FIG. 11C, and thus it is determined that the region is found. However, since the character string cannot be successfully obtained in step S1009, the processing proceeds to step S1011 and the learned printed character information is applied. As described above with reference to FIG. 11A, in step S907, the position of the region "M" and the character string are learned as the peripheral printed character region, and this region corresponds to the region found in step S1004. Accordingly, it is determined that the character string for which the OCR process has failed is "M", and the character string is presented to the user. Therefore, even when the circled symbol partially overlaps the printed character like in FIG. 11D, "APPLICATION_AAA AA_M" is presented as a candidate for the file name to the user.

As described above with reference to FIGS. 9 to 11D, in the learning process according to the first exemplary embodiment, a printed character selected with a circled symbol is learned as the character string used for the file name by the user, and the handwritten character region closest to the selected printed character region and information about printed character strings near the selected printed character region are stored in association with each other. With this configuration, if a circled symbol is added to an item different from the learned region in a new business form with a similar layout, the file name based on the printed characters to which the circled symbol is added is presented to the user based on the positional relationship between the learned printed character region and the handwritten character region. Further, since the learning process according to the first exemplary embodiment is performed based on the positional relationship between the handwritten character region and the printed character region, the process can be executed without the need for recognizing the structure of the entire business form, understanding the meaning of the business form, or performing high-cost time-consuming processes.

<Learning Process and Recommendation Process According to Second Exemplary Embodiment>

While the first exemplary embodiment described above illustrates an example of the learning process for a circled printed character string, a second exemplary embodiment illustrates a learning process and a recommendation process to be performed when a check mark is written in a checkbox provided near a printed character string. For example, as illustrated in FIG. 13A, a document in which checkboxes are provided near character strings "M" and "F", respectively, and a check mark is written by handwriting in one of the checkboxes, thereby selecting any one of items is used.

The learning process is performed based on the processes in the flowchart illustrated in FIG. 9, like in the first exemplary embodiment.

However, the second exemplary embodiment differs from the first exemplary embodiment in that, in step S904, the handwritten character region closest to the learning region (printed character region selected by the user) is a handwritten circled region in the first exemplary embodiment, while a check mark is written in a checkbox in the second exemplary embodiment.

Figure 13A:
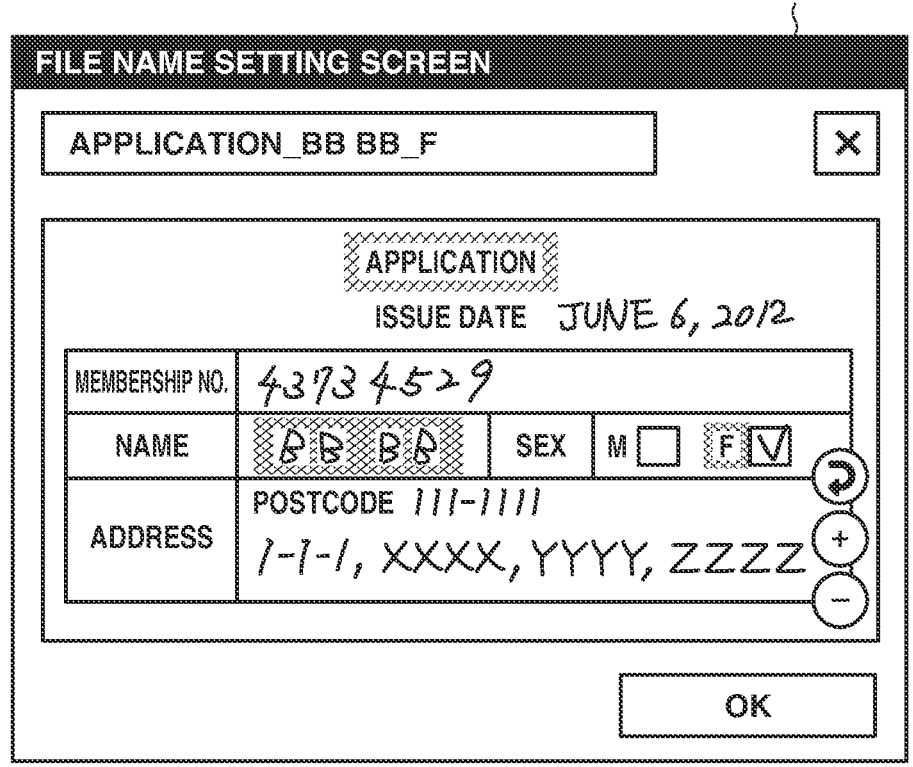
FIGS. 13A to 13D each illustrate a specific example of using a region corresponding to a printed character string indicated by a check mark in a checkbox as a file name.
Figure 13B:
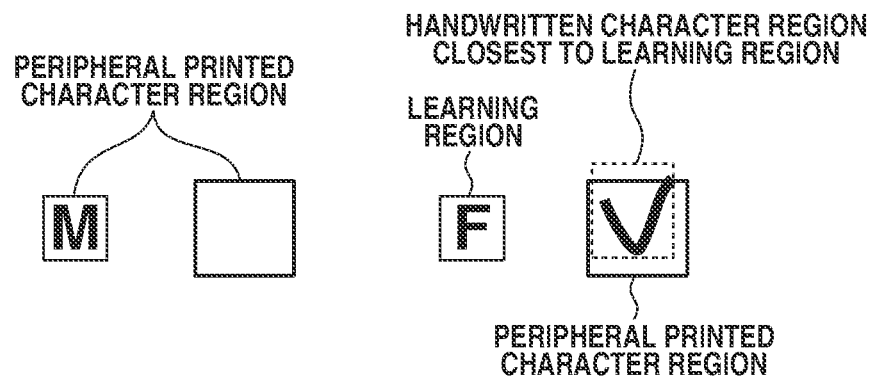

As illustrated in FIG. 13A, like in the first exemplary embodiment, after a business form is scanned, a target business form is selected and the file name setting screen 610 is opened. Then, a desired character region on the business form image is touched to set a file name. Assume that "APPLICATION_BB BB_F" illustrated in FIG. 13A is set as the file name FIG. 13B illustrates an example of the region stored in the input information storage process. The user selects the character string "APPLICATION" and the character string "BB BB", and then selects the character string "F". In step S908, these regions are stored as the learning regions. In the example illustrated in FIG. 13A, the region corresponding to the character string "F" is selected as a single learning region and the check mark in the checkbox on the right side is searched as the handwritten character region in step S904. Then, the positional information of the handwritten character region is stored in association in step S906. Further, in step S907, regions indicating "M" and the checkbox are searched as peripheral printed character regions and are stored.

Figure 12:
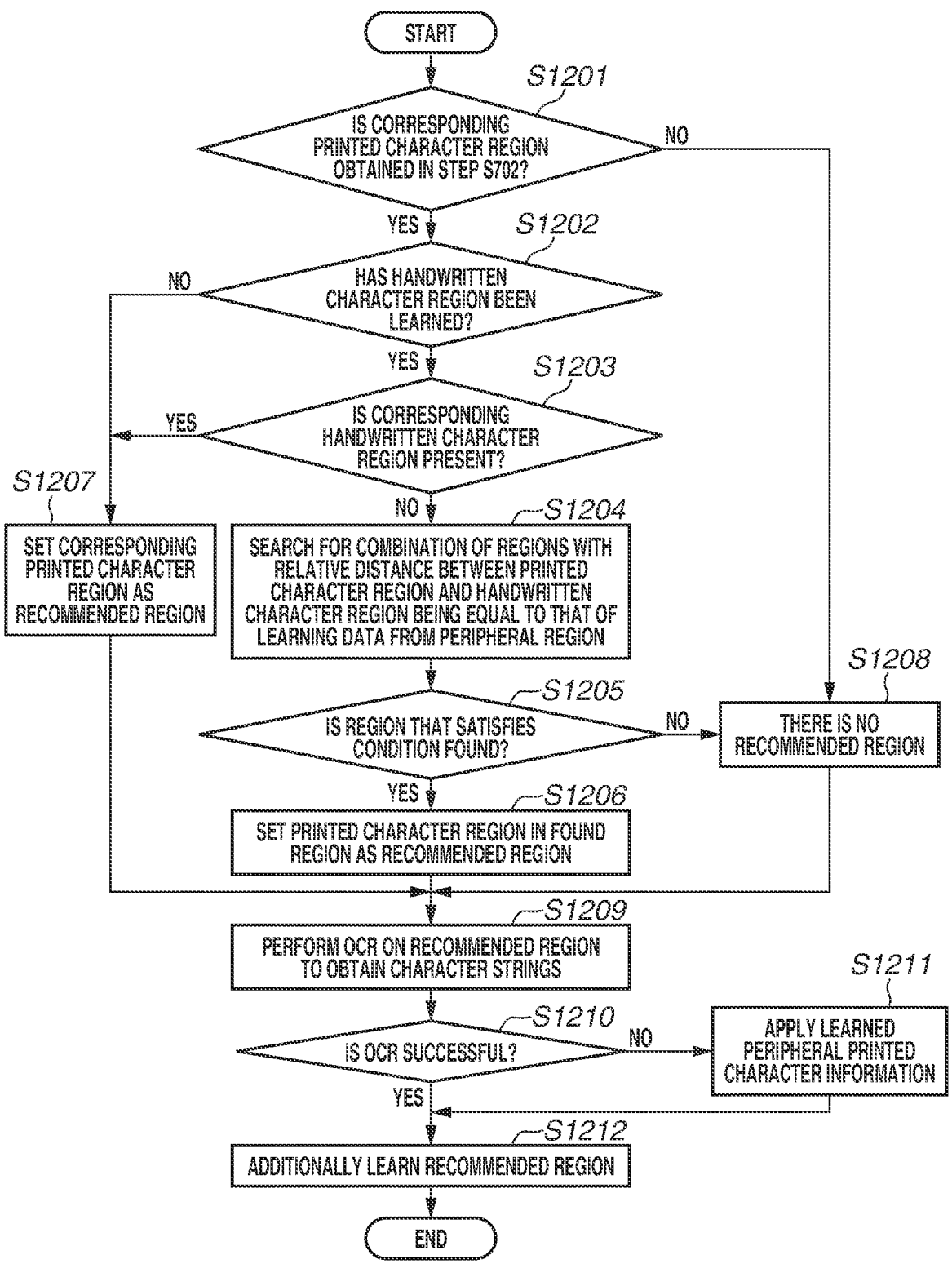
FIG. 12 is a flowchart illustrating a recommendation process according to a second exemplary embodiment.

FIG. 12 is a flowchart illustrating the character recognition process (file name recommendation process) in step S511 performed by the image processing unit 432 according to the second exemplary embodiment. This process flow is executed during the image analysis after a new business form is scanned in step S505. Steps S1201 to S1212 in this flow are similar to steps S1001 to S1012 illustrated in FIG. 10. However, if it is determined that the corresponding handwritten character region is not present in step S1203 (step S1003), the method for searching for a similar region in the peripheral region in step S1204 (step S1004) in the second exemplary embodiment is different from that in the first exemplary embodiment. In the case of a circled character described above in the first exemplary embodiment, a handwritten character region generally includes a printed character region. However, in the case of a checkbox, the checkbox is generally located on any one of upper, lower, right, and left sides of a printed character item based on the same rules. For example, as illustrated in FIGS. 13A to 13D, a checkbox is located on the right side of the character "M" or "F" indicating the gender, and the distance between each character and the corresponding checkbox is substantially equal. For this reason, the process for searching for a similar region is performed based on a relative distance between the learned printed character region and the handwritten character region.

Figure 13C:
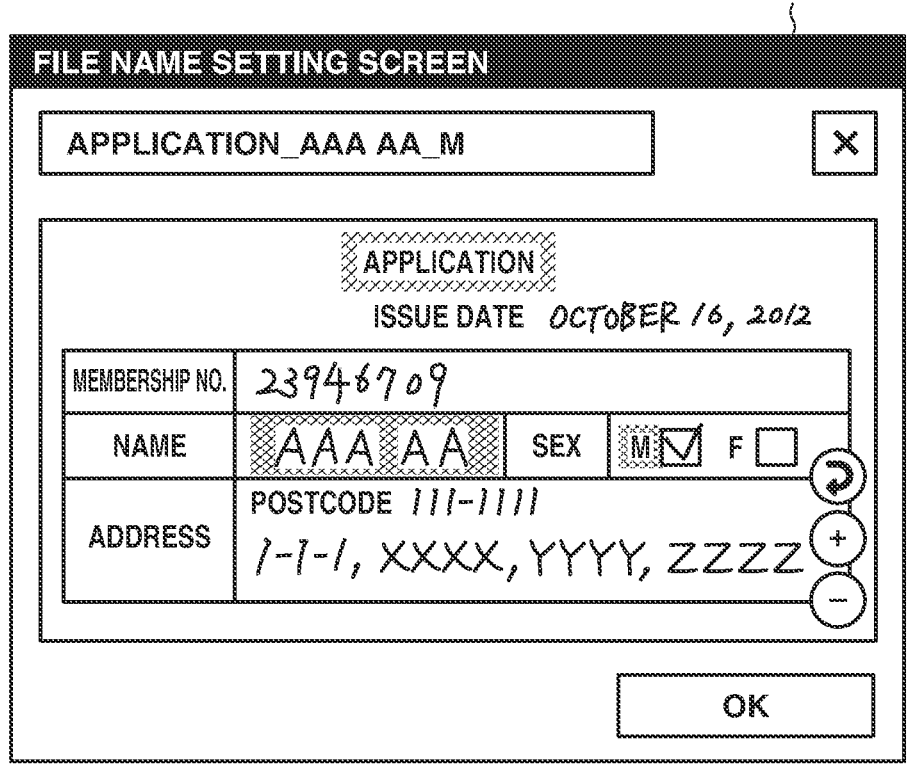
Figure 13D:
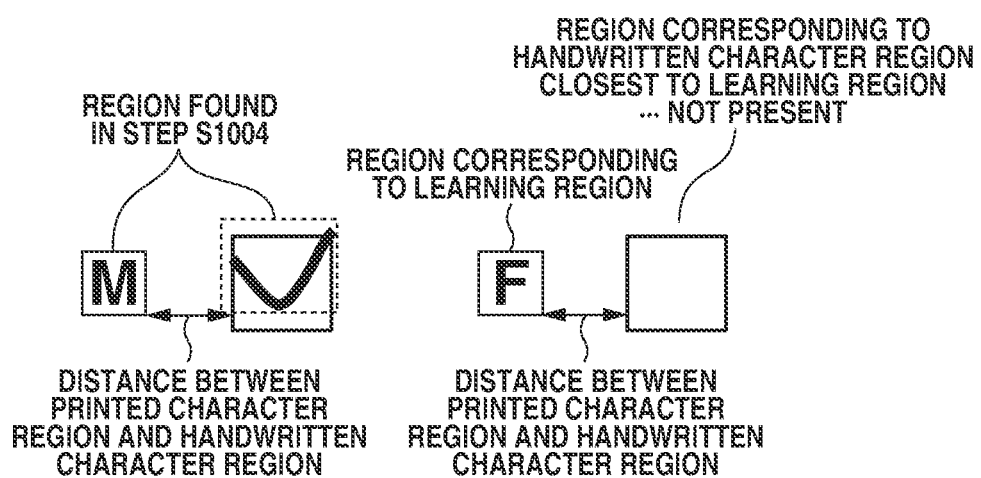

For example, a new business form is scanned and a check mark is handwritten in the checkbox located on the right side of the character string "M" in this new business form image, unlike in the learned business form. FIG. 13C illustrates the file name setting screen 610 to be displayed in this case. As indicated by the file name region illustrated in FIG. 13C, in this case, the file name "APPLICATION_AAA AA_M" is presented to the user. Two character strings "APPLICATION" and "AAA AA" are determined based on the character recognition result of the character region located at the same position as the learned character region, like in the first exemplary embodiment. On the other hand, the character string "M" is identified as follows as the recommended region. In the input information storage process, the region "F" is learned and is stored in association with the handwritten character region located on the right side of the region "F". However, as illustrated in FIG. 13D, a handwritten mark is not present at the position corresponding to the handwritten character region learned as the related region. Accordingly, in step S1204, a region with a similar positional relationship between the printed character region and the handwritten character region is searched in the peripheral region. In this case, two regions, i.e., the printed character region indicating "M" and the handwritten character region present on the right side of the printed character region are present. These two regions have substantially the same distance between the printed character region and the handwritten character region. The positional relationship between the two regions is also similar in that the handwritten character region is present on the right side of the printed character region and thus it is obvious that the search condition is satisfied. Accordingly, in step S1206, the printed character region in the found regions is determined to be the recommended region. In step S1209, the OCR process is performed on the recommended region and the character "M" is presented as a part of the file name.

As described above, if checkboxes are provided for the respective options, the printed character selected with the check mark by the user is learned as the character string used for the file name, thereby making it possible to recommend the character string as the file name. Also, in the second exemplary embodiment, the process is performed based on the positional information of the handwritten character region and the printed character region and the positional relationship between the regions. Consequently, the process can be executed without the need for performing high-cost time-consuming processes.

While the second exemplary embodiment illustrates a case where a single value is selected using a checkbox, the present disclosure can also be applied to a case where, for example, a plurality of items is selected. In this case, a combination of a plurality of regions is found in step S1204, and thus the subsequent processes may be recommended by combining the character strings found. For example, a plurality of character strings to which a check mark is added may be connected and presented, or a representative one of a plurality of character strings may be picked up and presented, or may be selected by the user.

<Learning Process According to Third Exemplary Embodiment>

A case where an erroneous handwritten character region is learned in the business form learning process will now be described. Examples of the case where an erroneous handwritten character region may be learned include a case where the handwritten character region closest to the learning region is not an intended region as illustrated in FIGS. 15A and 15B. In this case, when a business form similar to the learned business form is scanned, a file name that is not intended by the user is recommended. In this case, the user performs an operation for correcting the incorrect portion. Accordingly, in a third exemplary embodiment, learning based on the corrected content is further performed.

Figure 14:
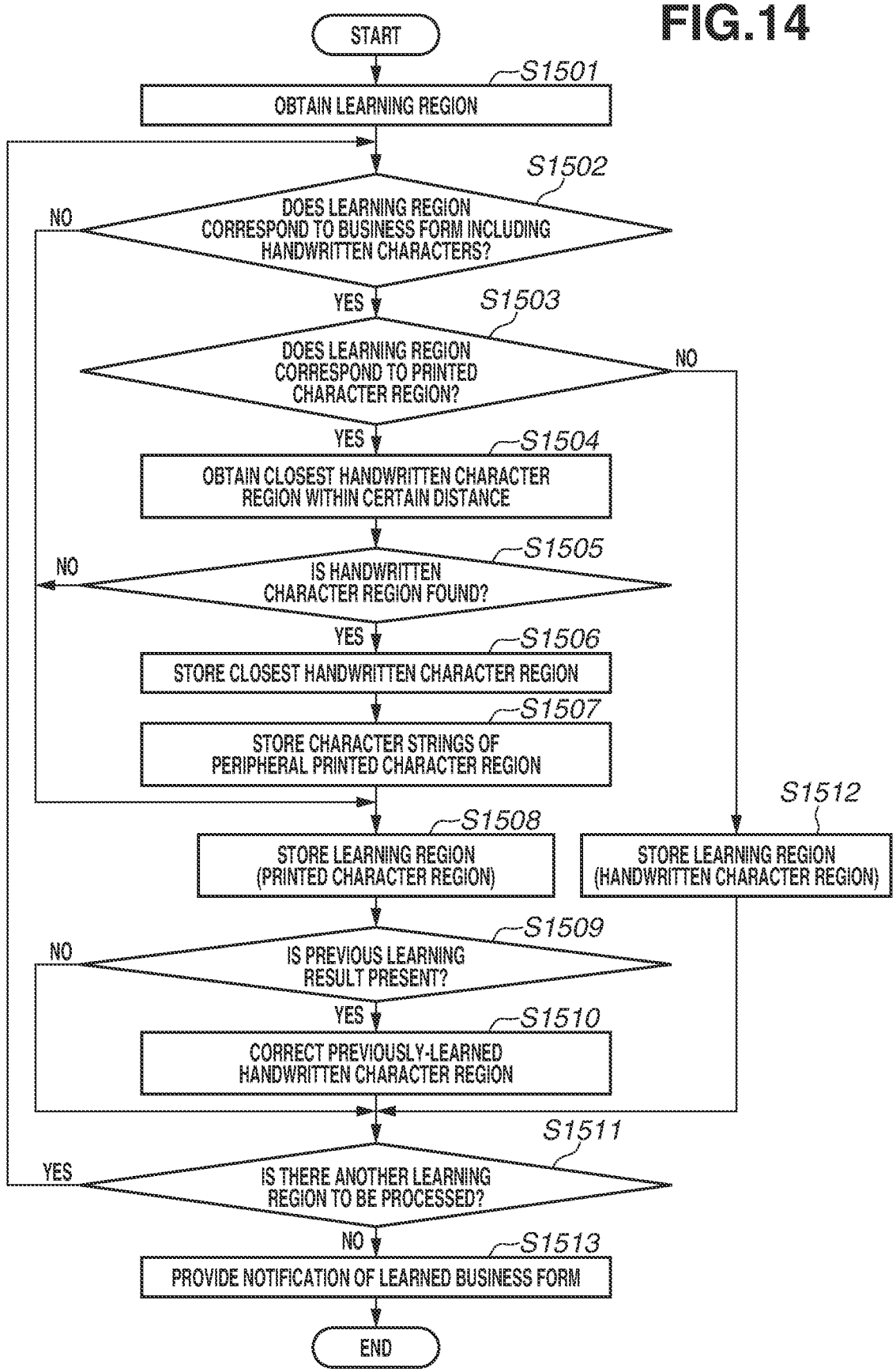
FIG. 14 is a flowchart illustrating an example of the input information storage process including a relearning process.

FIG. 14 is a flowchart illustrating an example of the input information storage process in step S518 performed by the image processing unit 432 according to the third exemplary embodiment. The user opens the file name setting screen 610 to confirm the presented file name. However, if the intended file name is not presented, the user performs a relearning operation. This process flow is executed during the relearning process. In the processes of steps S1501 to S1508, processes similar to steps S901 to S908 illustrated in FIG. 9 are performed to store the learned regions. In step S1509, it is determined whether the previous learning result is present in the target business form, that is, whether learning is updated. It can be determined whether learning is updated based on whether learning data (FIG. 8A) on the target business form is already present. If the learning data is not present (NO in step S1509), it is determined that learning is newly performed, and thus the processing proceeds to step S1511 without performing any other process. If the learning data is present (YES in step S1509), the processing proceeds to step S1510. In step S1510, information about the handwritten character region present in the learning data is corrected based on the currently updated region. This process will be described in detail below.

FIGS. 15A to 15E each illustrate a screen for the input information storage process. Like in the second exemplary embodiment, the user scans a business form, selects the target business form, opens the file name setting screen 610, touches the image corresponding to the business form, and sets a file name. Assume that "APPLICATION_BB BB_F" illustrated in FIG. 15A is set as the file name FIG. 15B illustrates an example of the region stored in the input information storage process. Since the user selects the character string "F" in step S1508, this region is stored as the learning region. Since this business form is a business form including handwritten characters, the closest handwritten character region is obtained and stored in step S1504. In the example illustrated in FIG. 15B, assume that the closest handwritten character region is determined to be a handwritten character region representing a membership number present on the upper side of the learning region. Specifically, the handwritten character region for the check mark is originally intended to be learned, but instead an irrelevant region is learned. In this case, if a similar business form is newly scanned, an erroneous character string is presented to the user as illustrated in FIG. 15C. Specifically, as illustrated in FIG. 15D, also in this newly scanned business form image, it is determined that the learning region and the region corresponding to the handwritten character region closest to the learning region are present. Therefore, the region "F" determined to be the corresponding printed character region is erroneously set as the recommended region.

If an erroneous file name is presented to the user as described above, the user corrects the setting of the file name on the same screen. In this case, the user cancels the character region in which "F" is selected, reselects the character region "M", and presses the OK button. This enables the image processing unit 432 to update the learning data. FIG. 15E illustrates an image of information to be newly learned during the update process.

As described above, since the user selects the character region "M", this region is learned as the learning region. Also, the region indicating the check mark found as the handwritten character region closest to the learning region is stored as the related region. Further, in step S1510, the previously learned handwritten character region is corrected based on the positional relationship between the corrected learning region and handwritten character region. In this case, the previously learned handwritten character region is a region indicating the membership number "43734529" illustrated in FIG. 15B. In place of this region, the region of the check mark corresponding to the second closest handwritten character region present on the right side of the learning region is set as a handwritten character region to be newly learned. Thus, when a similar business form is subsequently scanned, the occurrence of an error similar to that in the previous process can be avoided, thereby improving the accuracy of presenting a file name intended by the user. While the present exemplary embodiment illustrates an example where the second closest handwritten character region is set as a new learning region when the previously learned handwritten character region is corrected, the present exemplary embodiment is not limited to this example. For example, a related handwritten character region may be designated by the user, or a plurality of candidates may be presented to the user and the user may select any one of the candidates.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-009133, filed Jan. 22, 2021, which is hereby incorporated by reference herein in its entirety.

What is claimed is:

1. An image processing apparatus comprising:
   at least one memory that stores a program; and
   at least one processor that executes the program to perform:
   obtaining a plurality of regions including a printed character region and a handwritten character region from a first scanned image;
   learning information about a region selected by a user from among the plurality of regions obtained; and
   outputting a character string of a corresponding region in a second scanned image similar to the first scanned image based on the learned information,
   wherein, in the learning, in a case where the region selected by the user is the printed character region, it is determined whether the handwritten character region is present near the selected printed character region, and in a case where it is determined that the handwritten character region is present near the selected printed character region, information about the handwritten character region present near the selected printed character region and information about another printed character region present near the selected printed character region are learned in association with information about the selected printed character region.

2. The image processing apparatus according to claim 1, wherein the handwritten character region present near the selected printed character region is a handwritten symbol region surrounding the selected printed character region.

3. The image processing apparatus according to claim 1, wherein the handwritten character region present near the selected printed character region is a handwritten check mark region in a checkbox present near the selected printed character region.

4. The image processing apparatus according to claim 1, wherein, in a case where information about the handwritten character region present near the selected printed character region is learned in association with the selected printed character region, it is determined in the outputting whether the second scanned image includes the handwritten character region corresponding to the handwritten character region associated with the learned printed character region,
   wherein, in a case where it is determined in the outputting that the second scanned image includes the handwritten character region corresponding to the handwritten character region associated with the learned printed character region, a character string corresponding to the learned printed character region in the second scanned image is output, and
   wherein, in a case where it is determined in the outputting that the second scanned image includes no handwritten character region corresponding to the handwritten character region associated with the learned printed character region, a handwritten character region corresponding to another printed character region associated with the learned printed character region is searched, and in a case where the handwritten character region corresponding to the other printed character region is found, a character string corresponding to the other printed character region is output.

5. The image processing apparatus according to claim 1, wherein in a case where the output character string is corrected by the user, the at least one processor further performs relearning based on the corrected content.

6. An image processing method comprising:
   obtaining a plurality of regions including a printed character region and a handwritten character region from a first scanned image;
   learning information about a region selected by a user from among the plurality of regions obtained; and
   outputting a character string of a corresponding region in a second scanned image similar to the first scanned image based on the learned information,
   wherein, in the learning, in a case where the region selected by the user is the printed character region, it is determined whether the handwritten character region is present near the selected printed character region, and in a case where it is determined that the handwritten character region is present near the selected printed character region, information about the handwritten character region present near the selected printed character region and information about another printed character region present near the selected printed character region are learned in association with information about the selected printed character region.

7. A non-transitory computer-readable storage medium storing a program for causing a processor of an information processing apparatus to perform:
   obtaining a plurality of regions including a printed character region and a handwritten character region from a first scanned image;
   learning information about a region selected by a user from among the plurality of regions obtained; and
   outputting a character string of a corresponding region in a second scanned image similar to the first scanned image based on the learned information,
   wherein, in the learning, in a case where the region selected by the user is the printed character region, it is determined whether the handwritten character region is present near the selected printed character region, and in a case where it is determined that the handwritten character region is present near the selected printed character region, information about the handwritten character region present near the selected printed character region and information about another printed character region present near the selected printed character region are learned in association with information about the selected printed character region.

\* \* \* \* \*